United States Patent
Tanaka et al.

(10) Patent No.: US 7,705,856 B2
(45) Date of Patent: Apr. 27, 2010

(54) COLORING SUPPORT SYSTEM, COLORING SUPPORT PROGRAM, AND STORAGE MEDIUM AS WELL AS COLORING SUPPORT METHOD

(75) Inventors: Toshio Tanaka, Shiojiri (JP); Shinji Miwa, Hokuto (JP)

(73) Assignee: Seiko Epson Corporation (JP)

( * ) Notice: Subject to any disclaimer, the term of this patent is extended or adjusted under 35 U.S.C. 154(b) by 614 days.

(21) Appl. No.: 11/630,556

(22) PCT Filed: May 17, 2005

(86) PCT No.: PCT/JP2005/008949

§ 371 (c)(1),
(2), (4) Date: Dec. 21, 2006

(87) PCT Pub. No.: WO2005/124690

PCT Pub. Date: Dec. 29, 2005

(65) Prior Publication Data

US 2008/0316553 A1  Dec. 25, 2008

(30) Foreign Application Priority Data

Jun. 22, 2004  (JP)  ............................. 2004-183657

(51) Int. Cl.
- G06F 17/00 (2006.01)
- G09G 5/02 (2006.01)
- G09G 5/00 (2006.01)
- G09G 5/36 (2006.01)
- G03F 3/08 (2006.01)
- G06K 9/00 (2006.01)
- G06K 9/36 (2006.01)

(52) U.S. Cl. .................. 345/593; 345/589; 345/600; 345/619; 345/549; 358/518; 358/523; 382/162; 382/165; 382/167; 382/276; 715/200; 715/700

(58) Field of Classification Search .................. 345/589, 345/593, 597, 600, 619, 629, 630, 549; 358/518–519, 358/523–524, 537, 452; 382/162, 165, 167, 382/254, 276, 305; 715/200, 275, 273, 700, 715/764

See application file for complete search history.

(56) References Cited

U.S. PATENT DOCUMENTS

2001/0053246 A1  12/2001  Tachibana et al.

(Continued)

FOREIGN PATENT DOCUMENTS

EP  0 680 018 A2  3/1995

(Continued)

OTHER PUBLICATIONS

Meier, et al. "Interactive Color Palette Tools" IEEE Computer Society, (May/Jun. 2004) pp. 64-72.

(Continued)

*Primary Examiner*—Wesner Sajous
(74) *Attorney, Agent, or Firm*—Harness, Dickey & Pierce, P.L.C.

(57) ABSTRACT

A coloring support system suitable for realizing coloring that matches colors imaged by a user is provided.

A coloring support apparatus 100 inputs document data forming a document and acquires, on the basis of the document data inputted, color information concerning colors applied to the document. The coloring support apparatus 100 judges, on the basis of the color information acquired, coloring rules that match coloring applied to the document among coloring rules in a coloring rule registration DB 10 and matching colors that match the coloring rules among the colors applied to the document. The coloring support apparatus 100 displays, for each of the coloring rules judged, displays a name of the coloring rule and a coloring pallet including the matching color group.

6 Claims, 18 Drawing Sheets

U.S. PATENT DOCUMENTS

| | | | |
|---|---|---|---|
| 2003/0158617 A1* | 8/2003 | Turpin et al. | 700/97 |
| 2004/0175031 A1* | 9/2004 | Katsuyama | 382/165 |
| 2005/0071755 A1* | 3/2005 | Harrington et al. | 715/511 |
| 2005/0280845 A1* | 12/2005 | Hussie | 358/1.9 |
| 2006/0023940 A1* | 2/2006 | Katsuyama | 382/165 |
| 2007/0047809 A1* | 3/2007 | Sasaki | 382/170 |

FOREIGN PATENT DOCUMENTS

| | | |
|---|---|---|
| JP | 08-055119 | 2/1996 |
| JP | 08-249441 A | 9/1996 |
| JP | 08-305822 | 11/1996 |
| JP | 09-114958 A | 5/1997 |
| JP | 2002-373344 A | 12/2002 |
| JP | 2004-94803 A | 3/2004 |

OTHER PUBLICATIONS

International Search Report (in English) for PCT/JP2005/008949, ISA/JP, and WO of ISA (in Japanese) mailed Aug. 23, 2005.

* cited by examiner

|    | D1 | D2 | D3 | D4 | D5 | D6 |
|----|----|----|----|----|----|----|
| D1 |    | 1  | 0  | 0  | 0  | 1  |
| D2 |    |    | 1  | 0  | 0  | 0  |
| D3 |    |    |    | 0  | 0  | 1  |
| D4 |    |    |    |    | 1  | 0  |
| D5 |    |    |    |    |    | 0  |

| | max(\|r1-212\|,\|g1-231\|,\|b1-210\|)<16 | max(\|r2-236\|,\|g2-228\|,\|b2-190\|)<16 | max(\|r3-216\|,\|g3-226\|,\|b3-241\|)<16 |
|---|---|---|---|
| D1 | 0 | 0 | 0 |
| D2 | 0 | 0 | 0 |
| D3 | 0 | 0 | 0 |
| D4 | 0 | 1 | 0 |
| D5 | 1 | 0 | 0 |
| D6 | 0 | 0 | 1 |

FIG. 8

| No. | NAME | COLORING RULE | IMAGE WORD |
|---|---|---|---|
| 1 | THREE-COLOR COLORING PATTERN | max(\|r1-212\|,\|g1-231\|,\|b1-210\|)<p1& max(\|r2-236\|,\|g2-228\|,\|b2-190\|)<p1& max(\|r3-216\|,\|g3-226\|,\|b3-241\|)<p1 | CUTE |
| 2 | TWO-COLOR COLORING PATTERN | max(\|r1-197\|,\|g1-81\|,\|b1-84\|)<p1& max(\|r2-178\|,\|g2-99\|,\|b2-24\|)<p1 | ELEGANT |
| 3 | MAKE VISIBILITIES AND CHROMAS UNIFORM | max(\|v1-v2\|,\|c1-c2\|)<p2 | HARMONY |
| 4 | MAKE HUES UNIFORM | \|h1-h2\|<p2 | CALMNESS |
| 5 | USE BLUISH COLOR | b1>g1&g1>r1&r1<128&b1>160 | INTELLECTUAL |
| 6 | INCREASE VISIBILITIES AND CHROMAS | c1>13&c1+v1>15 | STRONG |
| 7 | CONTROL HUE ON WIDE SURFACE | AREA>p3&c1<10 | CALMNESS |
| 8 | CONTROL NUMBER OF COLORS | NUMBER OF COLORS ≤ 3 | INTELLECTUAL |
| ... | | | |
| 12 | TWO-COLOR COLORING PATTERN | max(\|r1-0\|,\|g1-255\|,\|b1-0\|)<p1& max(\|r2-255\|,\|g2-0\|,\|b2-255\|)<p1 | INTELLECTUAL |
| ... | | | |
| 23 | THREE-COLOR COLORING PATTERN | max(\|r1-0\|,\|g1-0\|,\|b1-0\|)<p1& max(\|r2-0\|,\|g2-255\|,\|b2-0\|)<p1& max(\|r3-255\|,\|g3-0\|,\|b3-255\|)<p1 | INTELLECTUAL |

FIG.14

| No. | NAME | COLORING RULE | RELATED COLORING RULE (No.) |
|---|---|---|---|
| 1 | THREE-COLOR COLORING PATTERN | max($\|r1-212\|, \|g1-231\|, \|b1-210\|$)<p1& max($\|r2-236\|, \|g2-228\|, \|b2-190\|$)<p1& max($\|r3-216\|, \|g3-226\|, \|b3-241\|$)<p1 | 15, 19 |
| 2 | TWO-COLOR COLORING PATTERN | max($\|r1-197\|, \|g1-81\|, \|b1-84\|$)<p1& max($\|r2-178\|, \|g2-99\|, \|b2-24\|$)<p1 | 18 |
| 3 | MAKE VISIBILITIES AND CHROMAS UNIFORM | max($\|v1-v2\|, \|c1-c2\|$)<p2 | 7, 17 |
| 4 | MAKE HUES UNIFORM | $\|h1-h2\|$<p2 | 10 |
| 5 | USE BLUISH COLOR | b1>g1&g1>r1&r1<128&b1>160 | 8, 23 |
| 6 | INCREASE VISIBILITIES AND CHROMAS | c1>138&c1+v1>15 | 9 |
| 7 | CONTROL CHROMA ON WIDE SURFACE | AREA>p3&c1<10 | 4 |
| 8 | CONTROL NUMBER OF COLORS | NUMBER OF COLORS ≤3 | 12 |
| 12 | TWO-COLOR COLORING PATTERN | max($\|r1-0\|, \|g1-0\|, \|b1-0\|$)<p1& max($\|r2-255\|, \|g2-0\|, \|b2-255\|$)<p1 | 7, 23 |
| 23 | THREE-COLOR COLORING PATTERN | max($\|r1-0\|, \|g1-0\|, \|b1-0\|$)<p1& max($\|r2-0\|, \|g2-0\|, \|b2-255\|$)<p1& max($\|r3-255\|, \|g3-0\|, \|b3-255\|$)<p1 | 8, 12 |

FIG.18

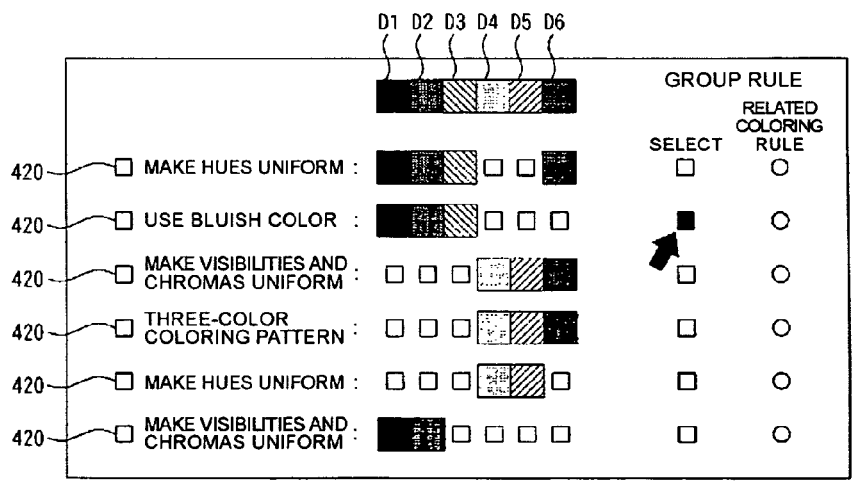

FIG.19

COLORING SUPPORT SYSTEM, COLORING SUPPORT PROGRAM, AND STORAGE MEDIUM AS WELL AS COLORING SUPPORT METHOD

Coloring Support System, Coloring Support Program, and Storage Medium as well as Coloring Support Method. The present application is a National Stage of PCT/JP2005/008949 dated May 17, 2005, which claims priority to JP2004-183657 dated Jun. 22, 2004.

TECHNICAL FIELD

The present invention relates to a system and a program as well as a method for supporting work for applying coloring to a document, and, in particular, to a coloring support system, a coloring support program, and a storage medium as well as a coloring support method that are suitable for realizing coloring that matches colors imaged by a user.

BACKGROUND ART

Conventionally, in preparing a color document such as a catalogue or a leaflet by applying coloring to a document, as a technique for providing guide information for supporting a user's work of applying coloring to the document, there is, for example, an image output apparatus disclosed in a Patent Document 1 and a document processing apparatus disclosed in a Patent Document 2.

In the invention described in the Patent Document 1, when a user selects a type of a target document out of selection items displayed in a window on a screen on the basis of a type table, image words corresponding to the type of the document are displayed on the basis of an image table. When the user selects a target image word out of the image words, coloring and a typeface corresponding to the image word are determined on the basis of an image coloring conversion table.

The invention described in the Patent Document 2 has a coloring table in which color lists defining combinations of colors to be candidates of staining with respect to sets of components of a document are registered for each image word. All image words and types of all components included in the color lists are retrieved from the coloring table and displayed. When an image word is selected out of the image words by a user, a color list corresponding to the image word selected is retrieved from the coloring table and displayed. The user applies coloring to a document on the basis of the color list displayed.

[Patent Document 1] JP-A-8-305822
[Patent Document 2] JP-A-8-55119

However, in both the inventions described in the Patent Document 1 and the Patent Document 2, when the user selects an image word, coloring candidates corresponding to the image word are displayed. Thus, there is a problem in that, when an image supposed by the user and an image of the image word selected do not coincide with each other, it is difficult to realize coloring that matches the colors imaged by the user. For example, it is possible to use an image word "cold" to represent comfortable coldness and to represent a sense of unapproachable cool-headedness. When a system adopts "cold" as a word representing one image and defines coloring candidates in association with the image word, if the user selects the image word "cold" supposing the other image, coloring candidates different from the colors imaged by the user are displayed.

It may be impossible to represent the image supposed by the user in words. In such a case, it is difficult to realize coloring that matches the colors imaged by the user.

Therefore, the invention has been devised in view of the unsolved problems of such conventional techniques and it is an object of the invention to provide a coloring support system, a coloring support program, and a storage medium as well as a coloring support method that are suitable for realizing coloring that matches colors imaged by a user.

DISCLOSURE OF THE INVENTION

[Form 1] In order to attain the object, a coloring support system in a form 1 is a coloring support system that supports work for applying coloring to a document, characterized by including:

color information acquiring means that acquires, on the basis of document data forming the document, color information concerning colors applied to the document;

coloring rule analyzing means that judges, on the basis of the color information acquired by the color information acquiring means, coloring rules that match coloring applied to the document or coloring rules related to the coloring rules; and coloring rule presenting means that presents the coloring rules judged by the coloring rule analyzing means.

With such a constitution, color information concerning colors applied to a document is acquired by the color information acquiring means on the basis of document data. Coloring rules that match coloring applied to the document or coloring rules related to the coloring rules are judged by the coloring rule analyzing means on the basis of the color information acquired. The coloring rules judged are presented by the coloring rule presenting means.

Consequently, coloring rules considered to be applied to a document to which a user applies coloring or coloring rules related to the coloring rules are presented. Thus, if the user applies further coloring to the document or corrects the current coloring with reference to the coloring rules presented, it is possible to realize coloring that relatively matches colors imaged by the user. Therefore, compared with the system in the past, it is possible to obtain an advantage that it is easy to realize coloring that matches the colors imaged by the user.

"Present" includes, other than displaying the coloring rules on a display device or the like, printing the coloring rules in a printing apparatus or the like and, when the system communicates with the user via a network, transmitting the coloring rules to a user terminal. Therefore, "present" includes at least display, printing, and transmission. The same holds true for a coloring support system in a form 2, a coloring support program in forms 9 and 10, a storage medium in forms 17 and 18, and a coloring support method in forms 25 and 26.

A "document" means images, characters, figures, and other elements and combinations of the elements. "Document data" means data including images, characters, figures, and other elements. When the document data includes only images, the document data means image data itself. When the document data includes only characters, the document data means text data itself. The same holds true for the coloring support system in the form 2, the coloring support program in the forms 9 and 10, the storage medium in the forms 17 and 18, and the coloring support method in the forms 25 and 26.

"Presenting coloring rules" include, other than presenting the coloring rules themselves, presenting identification information for identifying the coloring rules. As the identification information, for example, a diagram in which the coloring rules are modeled, a link destination of the coloring rules, or a name, a number, or an ID of the coloring rules is possible.

The same holds true for the coloring support system in the form 2, the coloring support program in the forms 9 and 10, the storage medium in the forms 17 and 18, and the coloring support method in the forms 25 and 26.

The coloring rules related to the coloring rules include, for example, when plural coloring rules are grouped, other coloring rules belonging to a group identical with a group to which coloring rules that match coloring applied to a document belongs and coloring rules similar to the coloring rules that match the coloring applied to the document. The same holds true for the coloring support system in the form 2, the coloring support program in the forms 9 and 10, the storage medium in the forms 17 and 18, and the coloring support method in the forms 25 and 26.

The system may be realized as a single apparatus, terminal, and some other device or may be realized as a network system to which plural apparatuses, terminals, and other devices are connected to be capable of communicating with one another. In the latter case, respective components may belong to any one of the plural devices as long as the components are connected to be capable of communicating with one another. The same holds true for the coloring support system in the form 2.

[Form 2] The coloring support system in the form 2 is a coloring support system that supports work for applying coloring to a document, characterized by including:

coloring rule storing means that stores coloring rules defining coloring;

document data inputting means that inputs document data forming the document;

color information acquiring means that acquires, on the basis of the document data inputted by the document data inputting means, color information concerning colors applied to the document;

coloring rule analyzing means that judges, on the basis of the color information acquired by the color information acquiring means, coloring rules that match coloring applied to the document among the coloring rules in the coloring rule storing means and matching colors that match the coloring rules among colors applied to the document; and coloring rule presenting means that presents the coloring rules judged by the coloring rule analyzing means and coloring pallets, which include the matching colors judged by the coloring rule analyzing mean, colors approximating to the matching colors, or colors obtained by combining the colors, in association with one another.

With such a constitution, document data is inputted by the document data inputting means and color information concerning colors applied to a document is acquired by the color information acquiring means on the basis of the document data inputted. Subsequently, coloring rules that match coloring applied to the document among coloring rules in the coloring rule storing means and matching colors that match the coloring rule among colors applied to the document are judged on the basis of the color information acquired by the coloring rule analyzing means. The coloring rules judged and coloring pallets, which include the matching colors judged, colors approximating to the matching colors, or colors obtained by combining the colors, are presented by the coloring rule presenting means in association with one another.

Consequently, coloring rules considered to be applied to a document to which a user applies coloring and matching colors that match the coloring rules among colors applied to the document or colors related to the matching colors are presented as coloring pallets. Thus, if the user applies further coloring to the document or corrects the present coloring with reference to the coloring rules and the coloring pallets presented, it is possible to realize coloring that relatively matches colors imaged by the user. Therefore, compared with the system in the past, there is an advantage that it is easy to realize coloring that matches the colors imaged by the user.

The approximating colors include defined colors defined according to the coloring rules. In other words, when matching colors that matches coloring rules among colors applied to a document and defined colors defined by the coloring rules do not coincide with each other completely, the defined colors may be presented as coloring pallets. The same holds true for the coloring support program in the form 10 and the coloring support method in the form 26.

The coloring rule storing means stores coloring rules with every means and in every period. The coloring rule storing means may store the coloring rules in advance or may store the coloring rules according to an input or the like from the outside at the time of operation of the system rather than storing the coloring rules in advance.

[Form 3] A coloring support system in a form 3 is characterized by including, in the coloring support system in the form 2:

coloring rule selecting means that causes a user to input selection of any one of the coloring rules presented by the coloring rule presenting means; and coloring correcting means that corrects, on the basis of the coloring rule selected by the coloring rule selecting means, matching colors that match the coloring rule among the colors applied to the document.

With such a constitution, when the user inputs selection of any one of the presented coloring rules using the coloring rule selecting means, on the basis of the coloring rule selected, matching colors that match the coloring rule among the colors applied to the document are corrected by the coloring correcting means.

Consequently, matching colors that match the coloring rules among colors applied to the document are corrected on the basis of coloring rules considered to be applied to a document to which coloring is applied by the user. Thus, there is an advantage that even a user not having know-how concerning correction of coloring easily realizes coloring that matches colors imaged by the user.

[Form 4] A coloring support system in a form 4 is characterized in that, in the coloring support system in the form 3, the coloring rule selecting means can designate an additional applied color out of colors other than those corresponding to the respective colors of the coloring pallets among the colors applied to the document, and the coloring correcting means corrects, on the basis of the coloring rule selected by the coloring rule selecting means, the matching colors and the additional applied color designated by the coloring rule selecting means.

With such a constitution, when the user inputs, using the coloring rule selecting means, designation of the additional applied color out of the colors other than those corresponding to the respective colors of the coloring pallets among the colors applied to the document, the matching colors and the additional applied color designated are corrected by the coloring correcting means on the basis of the selected coloring rule.

Consequently, when the user designates an additional applied color to which the user wishes to apply the coloring rules among the colors applied to the document with reference to the presented coloring rules and the coloring pallets, the matching colors and the additional applied color are corrected on the basis of the coloring rules. Thus, it is possible to easily expand an application range of the coloring rules.

Therefore, there is an advantage that even a user not having know-how concerning correction of coloring more easily realizes coloring that matches colors imaged by the user.

[Form 5] A coloring support system in a form 5 is characterized in that, in the coloring support system in the form 3 or 4, the coloring rule selecting means can designate an unapplied color out of the respective colors of the coloring pallets, and the coloring correcting means corrects, on the basis of the coloring rule selected by the coloring rule selecting means, colors other than a color corresponding to the unapplied color designated by the coloring rule selecting means in the matching colors.

With such a constitution, when the user inputs designation of an unapplied color out of the respective colors of the coloring pallets using the coloring rule selecting means, colors other than a color corresponding to the unapplied color designated in the matching colors are corrected by the coloring correcting means on the basis of the selected coloring rules.

Consequently, when the user designates an unapplied color to which the user does not wish to apply the coloring rules among the respective colors of the coloring pallets with reference to the presented coloring rules and the coloring pallets, colors other than a color corresponding to the unapplied color in the matching colors are corrected on the basis of the coloring rules. Thus, it is possible to easily reduce an application range of the coloring rules. Consequently, compared with coloring of all the colors according to the coloring rules, it is possible to perform more creative coloring. Therefore, there is an advantage that even a user not having know-how concerning correction of coloring more easily realizes coloring that matches colors imaged by the user.

[Form 6] A coloring support system in a form 6 is characterized in that, in the coloring support system in any one of the forms 2 to 5, the coloring rule storing means groups the coloring rules and stores the coloring rules grouped, and the coloring rule analyzing means judges coloring rules that match the coloring applied to the document among the coloring rules in the coloring rule storing means and other coloring rules belonging to a group identical with a group to which the coloring rule belongs.

With such a constitution, coloring rules that match the coloring applied to the document among the coloring rules in the coloring rule storing means and other coloring rules belonging to a group identical with a group to which the coloring rule belongs are judged by the coloring rule analyzing means. The coloring rules are presented by the coloring rule presenting means.

Consequently, not only coloring rules considered to be applied to a document to which the user applies coloring but also coloring rules related to the coloring rules are presented. Thus, there is an advantage that it is easier to realize coloring that matches colors imaged by the user.

"Grouping" means associating coloring rules with one another. Coloring rules associated with one another belong to an identical group and coloring rules not associated with one another belong to different groups. The association of the coloring rules may be performed directly or may be performed indirectly with the intervention of an image word or the like. When the association of the coloring rules is performed indirectly, the association may be performed not only at one stage but also at multiple stages. The same holds true for a coloring support program in a form 14 and a coloring support method in a form 30.

[Form 7] A coloring support system in a form 7 is characterized in that, in the coloring support system in the form 6, the coloring rule storing means stores the coloring rules in association with image words, the coloring rule presenting means presents the coloring rules, the coloring pallets, and the image words corresponding to the coloring rules in association with one another, the coloring support system includes image word selecting means that causes the user to input selection of any one of the image words presented by the coloring rule presenting means, and the coloring rule analyzing means retrieves other coloring rules corresponding to the image word selected by the image word selecting means from the coloring rule storing means.

With such a constitution, coloring rules, coloring pallets, and image words corresponding to the coloring rules are presented by the coloring rule presenting means in association with one another. When the user inputs selection of any one of the image words presented using the image word selecting means, other coloring rules corresponding to the image word selected are retrieved from the coloring rule storing means by the coloring rule analyzing means.

Consequently, when the user selects an image word that matches colors imaged by the user, the user can refer to other coloring rules corresponding to the image word. Thus, there is an advantage that it is possible to perform retrieval complying with the image and it is easier to realize coloring that matches the colors imaged by the user.

The image word means a notation giving an impression or a notation representing an impression. The same holds true for a coloring support program in a form 15 and a coloring support method in a form 31.

[Form 8] A coloring support system in a form 8 is characterized in that, in the coloring support system in any one of the forms 2 to 7, the coloring rule presenting means presents the coloring rules and the coloring pallets in association with each other by arranging the coloring rules and the respective colors of the coloring pallets in different directions, respectively.

With such a constitution, coloring rules and coloring pallets are presented by the coloring rule presenting means in association with each other by arranging the coloring rules and respective colors of coloring pallets two dimensionally.

Consequently, there is an advantage that it is easy to grasp association of the coloring rules and the coloring pallets.

[Form 9] On the other hand, in order to attain the object, the coloring support program in the form 9 is a coloring support program for supporting work for applying coloring to a document, the coloring support program characterized by causing a computer to execute:

a color information acquiring step of acquiring, on the basis of document data forming the document, color information concerning colors applied to the document;

a coloring rule analyzing step of judging, on the basis of the color information acquired in the color information acquiring step, coloring rules that match coloring applied to the document or coloring rules related to the coloring rules; and a coloring rule presenting step of presenting the coloring rules judged in the coloring rule analyzing step.

With such a constitution, when the program is read by the computer and the computer executes processing in accordance with the program read, actions and advantages equivalent to those in the coloring support system in the form 1 are obtained.

[Form 10] The coloring support program in the form 10 is a coloring support program for supporting work for applying coloring to a document, the coloring support program characterized by causing a computer to execute:

a document data inputting step of inputting document data forming the document;

a color information acquiring step of acquiring, on the basis of the document data inputted in the document data inputting step, color information concerning colors applied to the document;

a coloring rule analyzing step of judging, on the basis of the color information acquired in the color information acquiring step, coloring rules that match coloring applied to the document among coloring rules in coloring rule storing means, which stores coloring rules defining coloring, and matching colors that match the coloring rules among colors applied to the document; and a coloring rule presenting step of presenting the coloring rules judged in the coloring rule analyzing step and coloring pallets, which include the matching colors judged in the coloring rule analyzing step, colors approximating to the matching colors, or colors obtained by combining the colors, in association with one another.

With such a constitution, when the program is read by the computer and the computer executes processing in accordance with the program read, actions and advantages equivalent to those in the coloring support system in the form 2 are obtained.

[Form 11] A coloring support program in a form 11 is characterized by including, in the coloring support program in the form 10, a program for causing the computer to execute:

a coloring rule selecting step of causing a user to input selection of any one of the coloring rules presented in the coloring rule presenting step; and a coloring correcting step of correcting, on the basis of the coloring rule selected in the coloring rule selecting step, matching colors that match the coloring rule among the colors applied to the document.

With such a constitution, when the program is read by the computer and the computer executes processing in accordance with the program read, actions and advantages equivalent to those in the coloring support system in the form 3 are obtained.

[Form 12] A coloring support program in a form 12 is characterized in that, in the coloring support program in the form 11, in the coloring rule selecting step, the user is caused to designate an additional applied color out of colors other than those corresponding to the respective colors of the coloring pallets among the colors applied to the document, and in the coloring correcting step, the matching colors and the additional applied color designated in the coloring rule selecting step are corrected on the basis of the coloring rule selected in the coloring rule selecting step.

With such a constitution, when the program is read by the computer and the computer executes processing in accordance with the program read, actions and advantages equivalent to those in the coloring support system in the form 4 are obtained.

[Form 13] A coloring support program in a form 13 is characterized in that, in the coloring support program in the form 11 or 12, in the coloring rule selecting step, the user is caused to designate an unapplied color out of the respective colors of the coloring pallets, and in the coloring correcting step, colors other than a color corresponding to the unapplied color designated in the coloring rule selecting step in the matching colors are corrected on the basis of the coloring rule selected in the coloring rule selecting step.

With such a constitution, when the program is read by the computer and the computer executes processing in accordance with the program read, actions and advantages equivalent to those in the coloring support system in the form 5 are obtained.

[Form 14] A coloring support program in a form 14 is characterized in that, in the coloring support program according to any one of the forms 10 to 13, the coloring rule storing means groups the coloring rules and stores the coloring rules grouped, and in the coloring rule analyzing step, coloring rules that match the coloring applied to the document among the coloring rules in the coloring rule storing means and other coloring rules belonging to a group identical with a group to which the coloring rule belongs are judged.

With such a constitution, when the program is read by the computer and the computer executes processing in accordance with the program read, actions and advantages equivalent to those in the coloring support system in the form 6 are obtained.

[Form 15] A coloring support program in a form 15 is characterized in that, in the coloring support program in the form 14, the coloring rule storing means stores the coloring rules in association with image words, in the coloring rule presenting step, the coloring rules, the coloring pallets, and the image words corresponding to the coloring rules are presented in association with one another, the coloring support program includes a program for causing the computer to execute an image word selecting step of causing the user to input selection of any one of the image words presented in the coloring rule presenting step, and in the coloring rule analyzing step, other coloring rules corresponding to the image word selected in the image word selecting step are retrieved from the coloring rule storing means.

With such a constitution, when the program is read by the computer and the computer executes processing in accordance with the program read, actions and advantages equivalent to those in the coloring support system in the form 7 are obtained.

[Form 16] A coloring support program in a form 16 is characterized in that, in the coloring support program in any one of the forms 10 to 15, in the coloring rule presenting step, the coloring rules and the coloring pallets are presented in association with each other by arranging the coloring rules and the respective colors of the coloring pallets in different directions, respectively.

With such a constitution, when the program is read by the computer and the computer executes processing in accordance with the program read, actions and advantages equivalent to those in the coloring support system in the form 8 are obtained.

[Form 17] On the other hand, in order to attain the object, the storage medium in the form 17 is a computer readable recording medium having stored therein a coloring support program for supporting work for applying coloring to a document, the storage medium characterized by storing a program for causing a computer to execute:

a color information acquiring step of acquiring, on the basis of document data forming the document, color information concerning colors applied to the document;

a coloring rule analyzing step of judging, on the basis of the color information acquired in the color information acquiring step, coloring rules that match coloring applied to the document or coloring rules related to the coloring rules; and a coloring rule presenting step of presenting the coloring rules judged in the coloring rule analyzing step.

With such a constitution, when the program is read by the computer and the computer executes processing in accordance with the program read, actions and advantages equivalent to those in the coloring support system in the form 1 are obtained.

[Form 18] The storage medium in the form 18 is a computer readable storage medium having stored therein a coloring support program for supporting work for applying coloring to a document, the storage medium characterized by storing a program for causing a computer to execute:

a document data inputting step of inputting document data forming the document;

a color information acquiring step of acquiring, on the basis of the document data inputted in the document data inputting step, color information concerning colors applied to the document;

a coloring rule analyzing step of judging, on the basis of the color information acquired in the color information acquiring step, coloring rules that match coloring applied to the document among coloring rules in coloring rule storing means, which stores coloring rules defining coloring, and matching colors that match the coloring rules among colors applied to the document; and a coloring rule presenting step of presenting the coloring rules judged in the coloring rule analyzing step and coloring pallets, which include the matching colors judged in the coloring rule analyzing step, colors approximating to the matching colors, or colors obtained by combining the colors, in association with one another.

With such a constitution, when the program is read by the computer and the computer executes processing in accordance with the program read, actions and advantages equivalent to those in the coloring support system in the form 2 are obtained.

[Form 19] A storage medium in a form 19 is characterized by storing, in the storage medium in the form 18, a program for causing the computer to execute:

a coloring rule selecting step of causing a user to input selection of any one of the coloring rules presented in the coloring rule presenting step; and a coloring correcting step of correcting, on the basis of the coloring rule selected in the coloring rule selecting step, matching colors that match the coloring rule among the colors applied to the document.

With such a constitution, when the program is read by the computer and the computer executes processing in accordance with the program read, actions and advantages equivalent to those in the coloring support system in the form 3 are obtained.

[Form 20] A storage medium in a form 20 is characterized in that, in the storage medium in the form 19, in the coloring rule selecting step, the user is caused to designate an additional applied color out of colors other than those corresponding to the respective colors of the coloring pallets among the colors applied to the document, and in the coloring correcting step, the matching colors and the additional applied color designated in the coloring rule selecting step are corrected on the basis of the coloring rule selected in the coloring rule selecting step.

With such a constitution, when the program is read by the computer and the computer executes processing in accordance with the program read, actions and advantages equivalent to those in the coloring support system in the form 4 are obtained.

[Form 21] A storage medium in a form 21 is characterized in that, in the storage medium in the form 19 or 20, in the coloring rule selecting step, the user is caused to designate an unapplied color out of the respective colors of the coloring pallets, and in the coloring correcting step, colors other than a color corresponding to the unapplied color designated in the coloring rule selecting step in the matching colors are corrected on the basis of the coloring rule selected in the coloring rule selecting step.

With such a constitution, when the program is read by the computer and the computer executes processing in accordance with the program read, actions and advantages equivalent to those in the coloring support system in the form 5 are obtained.

[Form 22] A storage medium in a form 22 is characterized in that, in the storage medium in any one of the forms 18 to 21, the coloring rule storing means groups the coloring rules and stores the coloring rules grouped, and in the coloring rule analyzing step, coloring rules that match the coloring applied to the document among the coloring rules in the coloring rule storing means and other coloring rules belonging to a group identical with a group to which the coloring rule belongs are judged.

With such a constitution, when the program is read by the computer and the computer executes processing in accordance with the program read, actions and advantages equivalent to those in the coloring support system in the form 6 are obtained.

[Form 23] A storage medium in a form 23 is characterized in that, in the storage medium in the form 22, the coloring rule storing means stores the coloring rules in association with image words, in the coloring rule presenting step, the coloring rules, the coloring pallets, and the image words corresponding to the coloring rules are presented in association with one another, the storage medium includes a program for causing the computer to execute an image word selecting step of causing the user to input selection of any one of the image words presented in the coloring rule presenting step, and in the coloring rule analyzing step, other coloring rules corresponding to the image word selected in the image word selecting step are retrieved from the coloring rule storing means.

With such a constitution, when the program is read by the computer and the computer executes processing in accordance with the program read, actions and advantages equivalent to those in the coloring support system in the form 7 are obtained.

[Form 24] A storage medium in a form 24 is characterized in that, in the storage medium in any one of the forms 18 to 23, in the coloring rule presenting step, the coloring rules and the coloring pallets are presented in association with each other by arranging the coloring rules and the respective colors of the coloring pallets in different directions, respectively.

With such a constitution, when the program is read by the computer and the computer executes processing in accordance with the program read, actions and advantages equivalent to those in the coloring support system in the form 8 are obtained.

[Form 25] On the other hand, in order to attain the object, the coloring support method in the form 25 is a coloring support method of supporting work for applying coloring to a document, characterized by including:

a color information acquiring step in which an arithmetic operation unit acquires, on the basis of document data that is read in a storage unit and forms the document, color information concerning colors applied to the document;

a coloring rule analyzing step in which the arithmetic operation unit judges, on the basis of the color information acquired in the color information acquiring step, coloring rules that match coloring applied to the document or coloring rules related to the coloring rules; and a coloring rule presenting step in which the arithmetic operation unit presents the coloring rules judged in the coloring rule analyzing step.

Consequently, advantages equivalent to those in the coloring support system in the form 1 are obtained.

[Form 26] The coloring support method in the form 26 is a coloring support method of supporting work for applying coloring to a document, characterized by including:

a document data inputting step of inputting document data forming the document to a storage unit;

a color information acquiring step in which an arithmetic operation unit acquires, on the basis of the document data inputted in the document data inputting step, color information concerning colors applied to the document;

a coloring rule analyzing step in which the arithmetic operation unit judges, on the basis of the color information acquired in the color information acquiring step, coloring rules that match coloring applied to the document among coloring rules in coloring rule storing means, which stores coloring rules defining coloring, and matching colors that match the coloring rules among colors applied to the document; and a coloring rule presenting step in which the arithmetic operation unit presents the coloring rules judged in the coloring rule analyzing step and coloring pallets, which include the matching colors judged in the coloring rule analyzing step, colors approximating to the matching color group, or colors obtained by combining the colors, in association with one another.

Consequently, advantages equivalent to those in the coloring support system in the form 2 are obtained.

[Form 27] A coloring support method in a form 27 is characterized by including, in the coloring support method in the form 26:

a coloring rule selecting step of causing a user to input selection of any one of the coloring rules presented in the coloring rule presenting step; and a coloring correcting step of correcting, on the basis of the coloring rule selected in the coloring rule selecting step, matching colors that match the coloring rule among the colors applied to the document.

Consequently, advantages equivalent to those in the coloring support system in the form 3 are obtained.

[Form 28] A coloring support method in a form 28 is characterized in that, in the coloring support method in the form 27, in the coloring rule selecting step, the user is caused to designate an additional applied color out of colors other than those corresponding to the respective colors of the coloring pallets among the colors applied to the document, and in the coloring correcting step, the matching colors and the additional applied color designated in the coloring rule selecting step are corrected on the basis of the coloring rule selected in the coloring rule selecting step.

Consequently, advantages equivalent to those in the coloring support system in the form 4 are obtained.

[Form 29] A coloring support method in a form 29 is characterized in that, in the coloring support method in the form 27 or 28, in the coloring rule selecting step, the user is caused to designate an unapplied color out of the respective colors of the coloring pallets, and in the coloring correcting step, colors other than a color corresponding to the unapplied color designated in the coloring rule selecting step in the matching colors are corrected on the basis of the coloring rule selected in the coloring rule selecting step.

Consequently, advantages equivalent to those in the coloring support system in the form 5 are obtained.

[Form 30] A coloring support method in a form 30 is characterized in that, in the coloring support method in any one of the forms 26 to 29, the coloring rule storing means groups the coloring rules and stores the coloring rules grouped, and in the coloring rule analyzing step, coloring rules that match the coloring applied to the document among the coloring rules in the coloring rule storing means and other coloring rules belonging to a group identical with a group to which the coloring rule belongs are judged.

Consequently, advantages equivalent to those in the coloring support system in the form 6 are obtained.

[Form 31] A coloring support method in a form 31 is characterized in that, in the coloring support method in the form 30, the coloring rule storing means stores the coloring rules in association with image words, in the coloring rule presenting step, the coloring rules, the coloring pallets, and the image words corresponding to the coloring rules are presented in association with one another, the coloring support method includes an image word selecting step of causing the user to input selection of any one of the image words presented in the coloring rule presenting step, and in the coloring rule analyzing step, other coloring rules corresponding to the image word selected in the image word selecting step are retrieved from the coloring rule storing means.

Consequently, advantages equivalent to those in the coloring support system in the form 7 are obtained.

[Form 32] A coloring support method in a form 32 is characterized in that, in the coloring support method in any one of the forms 26 to 31, in the coloring rule presenting step, the coloring rules and the coloring pallets are presented in association with each other by arranging the coloring rules and the respective colors of the coloring pallets in different directions, respectively.

Consequently, advantages equivalent to those in the coloring support system in the form 8 are obtained.

BRIEF DESCRIPTION OF THE DRAWINGS

FIG. 8 is a table for judging whether a coloring rule 1 is applied to a document.

FIG. 14 is a diagram showing a data structure of the coloring rule registration DB 30.

FIG. 18 is a diagram showing a data structure of the coloring rule registration DB 30.

FIG. 19 is a display screen in which coloring rules that match coloring applied to a document are displayed.

DESCRIPTION OF REFERENCE NUMERALS AND SIGNS

100: Coloring support apparatus, 10, 30: Coloring rule registration DBs, 12: Document data inputting unit, 14: Color information acquiring unit, 16, 32: Coloring rule analyzing units, 18, 34: Coloring rule display units, 20: Coloring rule selecting unit, 22: Coloring correcting unit, 24: Document data outputting unit, 36: Image word selecting unit, 50: CPU, 52: ROM, 54: RAM, 58: I/F, 59: Bus, 60: Input device, 62: Storage, 64: Display device, 420, 422: Check boxes

BEST MODE FOR CARRYING OUT THE INVENTION

Figure 1:
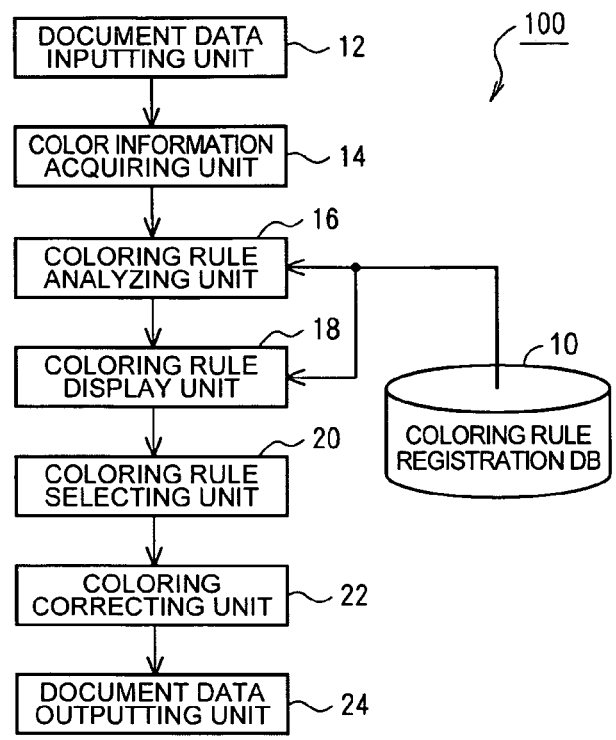
FIG. 1 is a functional block diagram showing schematic functions of a coloring support apparatus 100.
Figure 2:
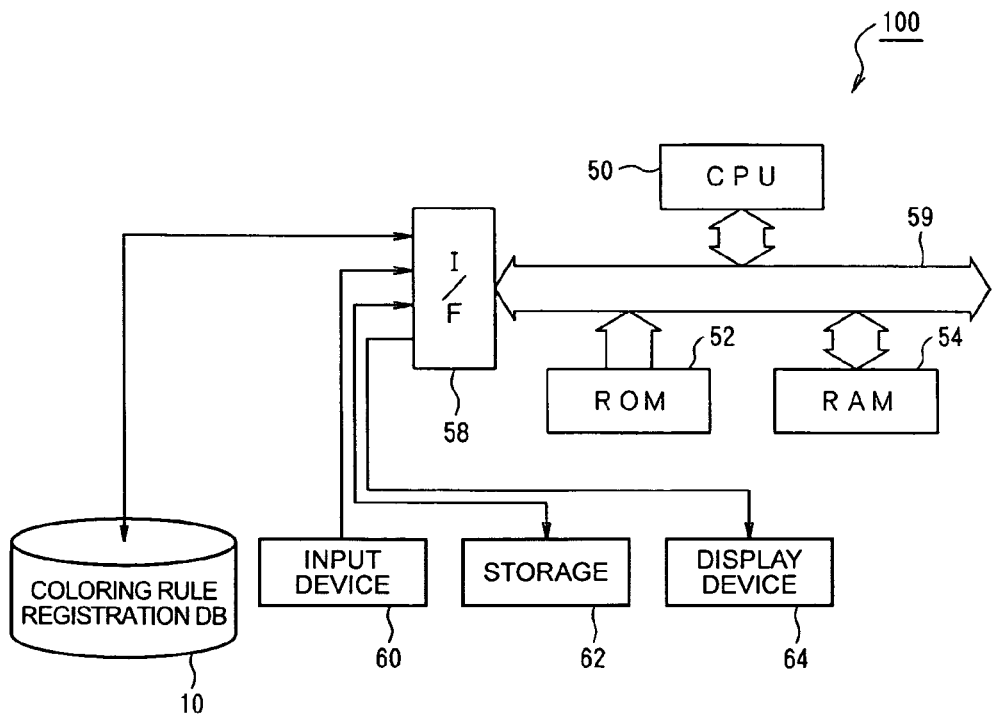
FIG. 2 is a block diagram showing a hardware configuration of the coloring support apparatus 100.

A first embodiment of the invention will be hereinafter explained with reference to the drawings. FIGS. 1 and 2 are diagrams showing the first embodiment of a coloring support system, a coloring support program, and a storage medium as well as a coloring support method according to the invention.

In this embodiment, the coloring support system, the coloring support program, and the recording medium as well as the coloring support method according to the invention are applied to a case in which, in preparing a color document by applying coloring to a document, guide information for supporting a user's work for applying coloring is displayed and correction of the coloring is automatically performed.

First, schematic functions of the coloring support apparatus 100 will be explained with reference to FIG. 1.

FIG. 1 is a functional block diagram showing the schematic functions of the coloring support apparatus 100.

The coloring support apparatus 100 includes, as shown in FIG. 1, a coloring rule registration database (database will be hereinafter simply referred to as DB) 10 in which coloring rules defining coloring are registered, a document data inputting unit 12 that inputs document data, and a color information acquiring unit 14 that acquires, on the basis of the document data inputted by the document data inputting unit 12, color information concerning colors applied to a document.

The coloring support apparatus 100 further includes a coloring rule analyzing unit 16 that analyses coloring rules applied to the document and a coloring rule display unit 18 that displays coloring rules obtained by the analysis of the coloring rule analyzing unit 16.

The coloring rule analyzing unit 16 judges, on the basis of the color information acquired by the color information acquiring unit 14, coloring rules that match the coloring applied to the document among the coloring rules in the coloring rule registration DB 10 and matching colors that match the coloring rules among the colors applied to the document.

The coloring rule display unit 18 displays the coloring rules judged by the coloring rule analyzing unit and coloring pallets including the matching colors judged by the coloring rule analyzing unit 16 in association with each other.

The coloring support apparatus 100 further includes a coloring rule selecting unit 20 that facilitates a user to select any one of the coloring rules displayed by the coloring rule display unit 18 and receives an input from the user, a coloring correcting unit 22 that corrects, on the basis of the coloring rule selected by the coloring rule selecting unit 20, matching colors that match the coloring rule among the colors applied to the document, and a document data outputting unit 24 that outputs document data forming the document for which coloring is corrected by the coloring correcting unit 22.

A constitution of the coloring support apparatus 100 will be explained with reference to FIGS. 2 to 5.

FIG. 2 is a block diagram showing a hardware configuration of the coloring support apparatus 100.

The coloring support apparatus 100 includes, as shown in FIG. 2, a CPU 50 that controls an arithmetic operation and the entire system on the basis of a control program, a ROM 52 that stores the control program and the like of the CPU 50 in advance in predetermined areas, a RAM 54 for storing data read out from the ROM 52 and the like and an arithmetic operation result required in an arithmetic operation process of the CPU 50, and an I/F 58 that mediates an input of data to external devices and an output of data from the external devices. These devices are connected to one another and to be capable of exchanging data via a bus 59 serving as a signal line for transferring data.

A coloring rule registration DB 10, an input device 60 including a keyboard, a mouse, and the like capable of inputting data as a human interface, a storage 62 that stores data, tables, and the like as files, and a display device 64 that displays a screen on the basis of an image signal are connected to the I/F 58 as the external devices.

Document data is created by a separate application program and stored in the storage 62 in some cases and is inputted via the input device 60 or read from the outside of the coloring support apparatus 100 via the input device 60 according to an instruction from the user and stored in the storage 62 or the RAM 54 in other cases.

A data structure of the coloring rule registration DB 10 will be explained in detail.

Figure 3:
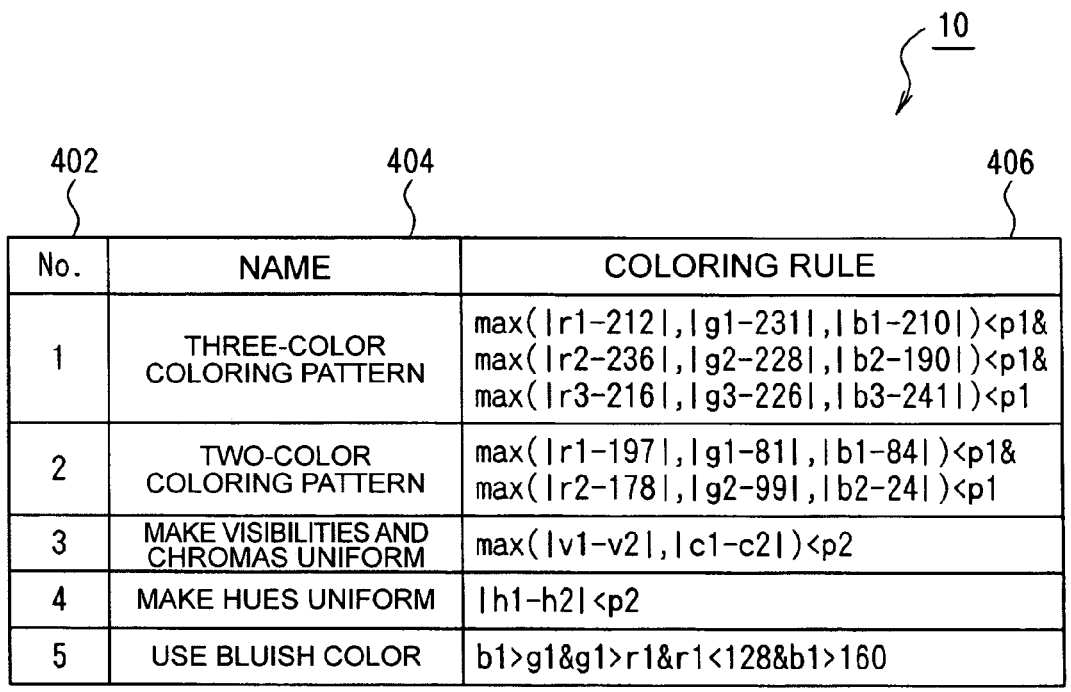
FIG. 3 is a diagram showing a data structure of a coloring rule registration DB 10.

FIG. 3 is a diagram showing the data structure of the coloring rule registration DB 10.

In the coloring rule registration DB 10, as shown in FIG. 3, one record is registered for each of coloring rules. Each record includes a field 402 in which a serial number uniquely allocated to the coloring rule is registered, a field 404 in which a name of the coloring rule is registered, and a field 406 in which the coloring rule is registered.

In FIG. 3, records in first and second rows define coloring rules concerning a coloring pattern. The coloring pattern represents, with a colorimetric system, a combination of plural colors considered preferable for coloring. When coloring rules for a coloring pattern of three colors (hereinafter referred to as three-color coloring and is abbreviated in the same manner in the following description) are defined, it is possible to represent a coloring pattern to be a reference color as, for example, "(212, 231, 210), (236, 228, 190), (216, 226, 241)" in three primary colors R, G, and B. Thus, it is possible to define the coloring rules for the three-color coloring according to the following Expression (1) with arbitrary three colors represented as (r1, g1, b1), (r2, g2, b2), and (r3, g3, b3) and a threshold value represented as p1. The threshold value p1 is set at the time of processing separately from the coloring rule registration DB 10.

$$\max(|r1-212|,|g1-231|,|b1-210|)<p1\&$$

$$\max(|r2-236|,|g2-228|,|b2-190|)<p1\&$$

$$\max(|r3-216|,|g3-226|,|b3-241|)<p1 \qquad (1)$$

In Expression (1), "max" is a function for returning a maximum among plural arguments given.

Similarly, it is possible to define coloring rules for two-color coloring according to the following Expression (2) when a coloring pattern to be a reference color is set as "(197, 81, 84), (178, 99, 24)".

$$\max(|r1-197|,|g1-81|,|b1-84|)<p1\&$$

$$\max(|r2-178|,|g2-99|,|b2-24|)<p1 \qquad (2)$$

In FIG. 3, a record in a third row defines a coloring rule for making value and chromas uniform. It is possible to define this coloring rule according to the following Expression (3) with arbitrary two colors acquired from document data represented in hue, visibility, and chroma as (h1, v1, c1) and (h2, v2, c2) and a threshold value represented as p2. The threshold value p2 is set at the time of processing separately from the coloring rule registration DB 10.

$$\max(|v1-v2|,|c1-c2|)<p2 \qquad (3)$$

In FIG. 3, a record in a fourth row defines a coloring rule for making hue uniform. It is possible to define this coloring rule according to the following Expression (4) with arbitrary two colors acquired from document data represented in hue, visibility, and chroma as (h1, v1, c1) and (h2, v2, c2) and a threshold value represented as p2. The threshold value p2 is set at the time of processing separately from the coloring rule registration DB 10.

$$|h1-h2|<p2 \qquad (4)$$

In FIG. 3, a record in a fifth row defines a coloring rule for using a bluish color. It is possible to define this coloring rule according to the following Expression (5) with an arbitrary one color acquired from the document data represented as (r1, g1, b1).

$$b1>g1\&g1>r1\&r1<128\&b1>160 \qquad (5)$$

In analysis of the coloring rules, the respective coloring rules are checked in order to find whether the coloring rules are applied to a document. Since the coloring rules are checked in order from the coloring rule having a largest number of colors related to the coloring rule, it is advisable to sort the coloring rules in order from one most likely to have a largest number of applied colors or in order from one actually having a largest number of applied colors and register the coloring rules in the coloring rule registration DB 10.

For example, whereas a coloring rule 1 (a coloring rule specified by a serial number "1" and abbreviated in the same manner in the following description) is applied to three colors in a document and a coloring rule 2 is applied to two colors in the document, coloring rules 3 and 4 are rules between two colors and applied as a combination of every two colors. Thus, it is likely that the coloring rules 3 and 4 are applied to two or more colors in the document. Whereas the coloring rule 3 includes two variables (v, c), the coloring rule 4 includes one variable (h). Thus, it is highly likely that the coloring rule 4 has a larger number of applied colors. Since the coloring rule 5 is a rule of one color, it is most likely that the coloring rule 5 has a large number of applied colors. Therefore, the coloring rules are sorted and stored to be checked in an order of the coloring rules 5, 4, 3, 1, and 2.

The coloring rules are not limited to the definitions in Expressions (1) to (5). Various forms of the coloring rules are possible. For example, it is also possible to define the coloring rule 1 according to the following Expression (6). In Expression (6), threshold values may be set to different values in three conditional expressions.

$$|r1-212|+|g1-231|+|b1-210|<p1\&$$

$$|r2-236|+|g2-228|+|b2-190|<p1\&$$

$$|r3-216|+|g3-226|+|b3-241|<p1 \qquad (6)$$

Figure 4:
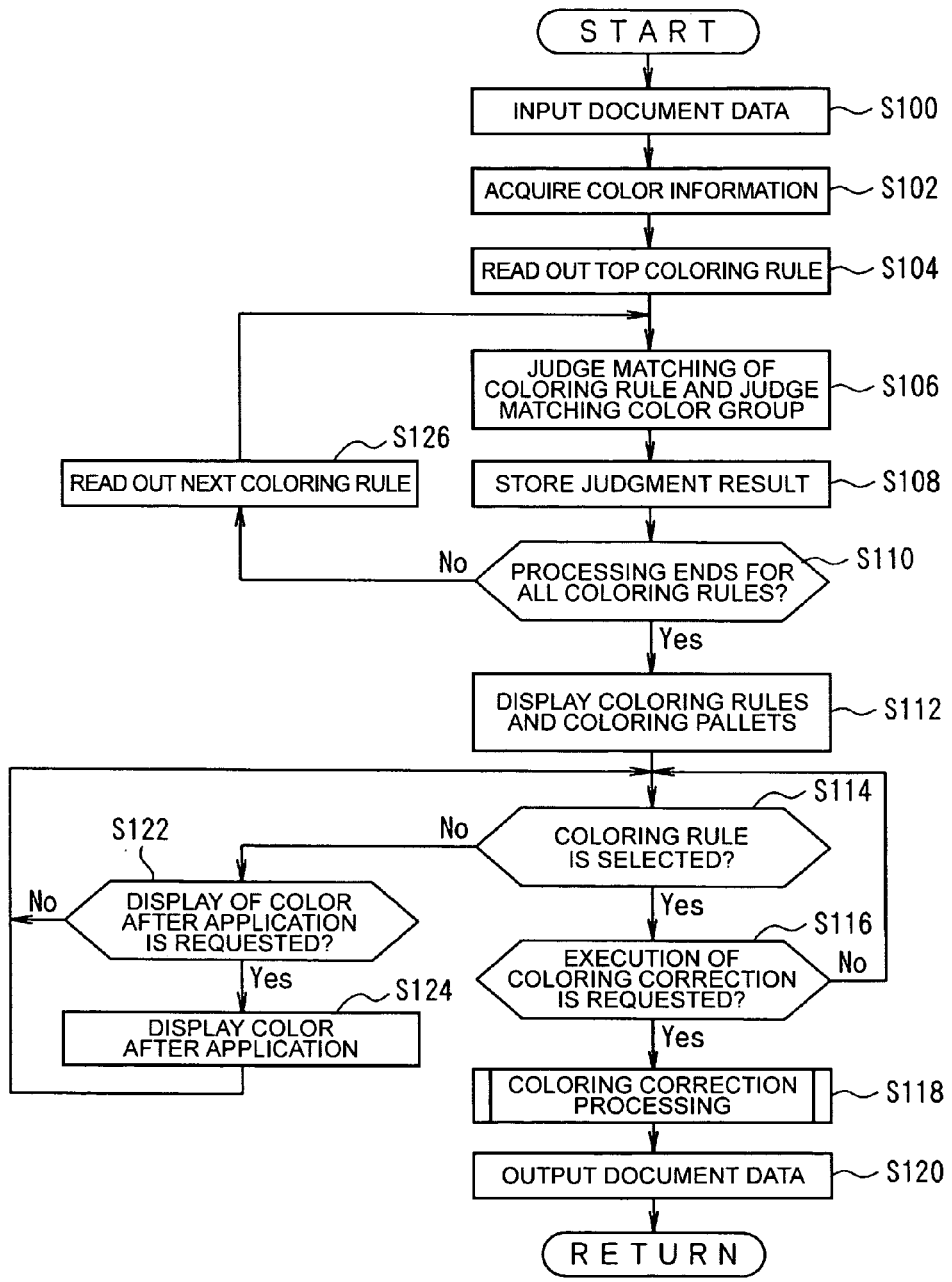
FIG. 4 is a flowchart showing coloring support processing.

Referring back to FIG. 2, the CPU 50 consists of a micro processing unit (MPU) or the like and is adapted to start a predetermined program stored in a predetermined area of the ROM 52 and execute coloring support processing shown in a flowchart in FIG. 4 in accordance with the program.

FIG. 4 is a flowchart showing the coloring support processing.

The coloring support processing is processing for displaying coloring rules considered to be applied to a document to which a user applies coloring and automatically correcting coloring of the document on the basis of coloring rule selected out of the coloring rules by the user. When the coloring support processing is executed in the CPU 50, as shown in FIG. 4, first, the CPU 50 shifts to step S100.

In step S100, the CPU 50 reads out document data to be an object of coloring support from the storage 62 or the outside of the coloring support apparatus 100, stores the document data in the RAM 54, and shifts to step S102. The CPU 50 acquires color information concerning colors applied to the document on the basis of the document data inputted and shifts to step S104.

In step S104, the CPU 50 reads out a top one in the sorted coloring rules from the coloring rule registration DB 10 and shifts to step S106. The CPU 50 judges whether the coloring rule read out matches any one of combinations of the colors applied to the document and judges matching colors that match the read-out coloring rule among the colors applied to the document. The CPU 50 shifts to step S108.

In step S108, the CPU 50 stores a result of the judgment in step S106 in the storage 62 or the RAM 54 and shifts to step S110. The CPU 50 judges whether the processing in steps S106 and S108 ends for all the coloring rules in the coloring rule registration DB 10. When it is judged that the processing ends for all the coloring rules (Yes), the CPU 50 shifts to step S112.

In step S112, for each of the coloring rules judged in step S106, the CPU 50 displays, on the basis of the judgment result stored in the storage 62 or the RAM 54, a name of the coloring rule and a coloring pallet including a matching color group on the display device 64 in association with each other and shifts to step S114.

In step S114, the CPU 50 judges whether any coloring rule is selected out of the displayed coloring rules by the input device 60. When it is judged that any coloring rule is selected (Yes), the CPU 50 shifts to step S116 and judges whether it is requested from the input device 60 that coloring correction should be executed. When it is judged that execution of the coloring correction is requested (Yes), the CPU 50 shifts to step S118.

In step S118, the CPU 50 executes coloring correction processing for correcting matching colors that match the coloring rule selected among the colors applied to the document and shifts to step S120. The CPU 50 outputs document data forming the document subjected to coloring correction in the coloring correction processing by storing the document data in the storage 62, ends the series of processing, and returns the program to the original processing.

On the other hand, when it is judged in step S116 that it is not requested that coloring correction processing should be executed (No), the CPU 50 shifts to step S114.

On the other hand, when it is judged in step S114 that no coloring rule is selected out of the displayed coloring rules (No), the CPU 50 shifts to step S122. The CPU 50 judges whether it is requested from the input device 60 that a color after coloring rules are applied to the document (hereinafter referred to as color after correction) should be displayed by designating any color out of the colors of the coloring pallet.

When it is judged that it is requested that the color after correction should be displayed (Yes), the CPU 50 shifts to step S124.

In step S124, the CPU 50 obtains, for the designated color, a color after correction of a coloring rule corresponding to the coloring pallet to the document, displays the color after correction obtained on the display device 64 in association with the designated color, and shifts to step S114.

On the other hand, when it is judged in step S122 that it is not requested that the color after correction should be displayed (No), the CPU 50 shifts to step S114.

On the other hand, when it is judged in step S110 that the processing in steps S106 and S108 does not end for all the coloring rules in the coloring rule registration DB 10 (No), the CPU 50 shifts to step S126, reads out the next coloring rule among the sorted coloring rules from the coloring rule registration DB 10, and shifts to step S106.

The coloring correction processing in step S118 will be explained in detail.

Figure 5:
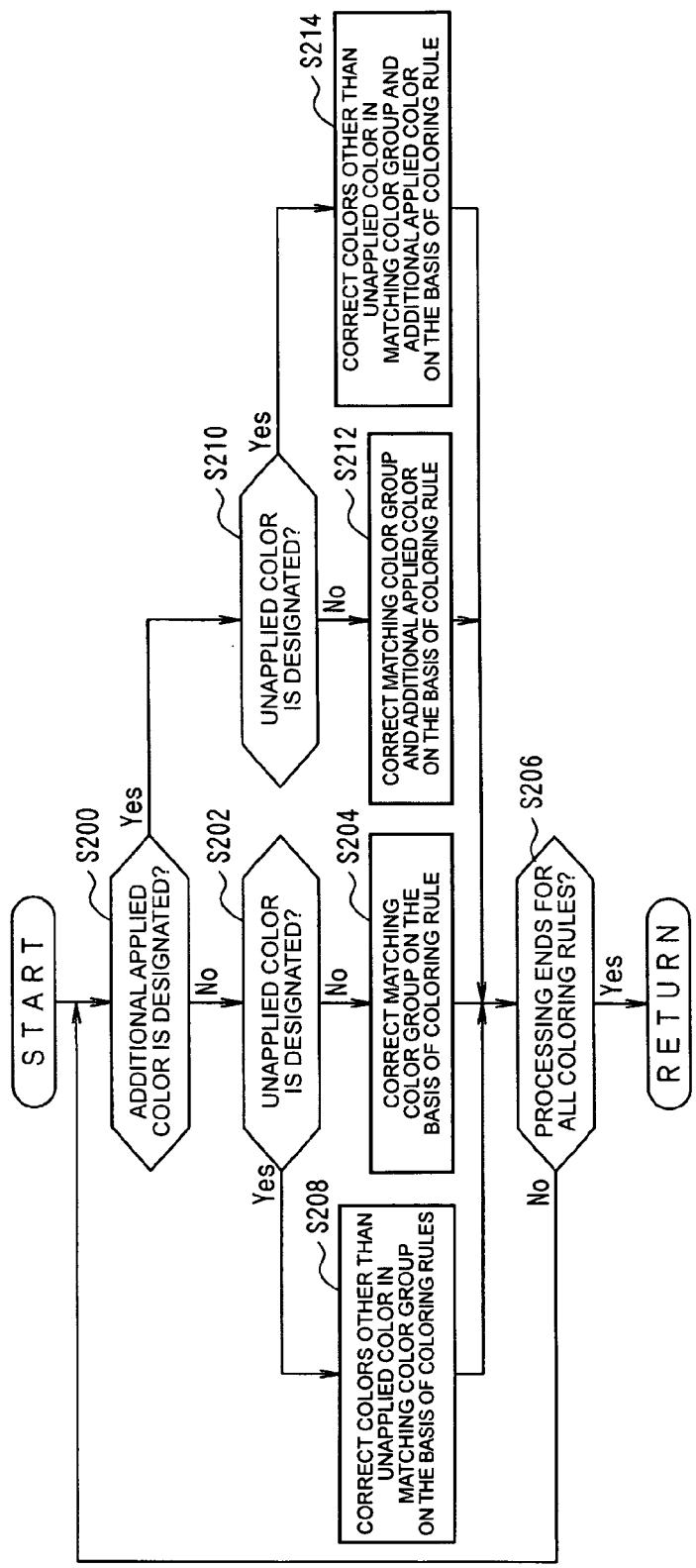
FIG. 5 is a flowchart showing coloring correction processing.

FIG. 5 is a flowchart showing the coloring correction processing.

When the coloring correction processing is executed in step S118, as shown in FIG. 5, first, the CPU 50 shifts to step S200.

In step S200, the CPU 50 judges whether any color (hereinafter referred to as additional applied color) is designated out of colors other than those corresponding to the respective colors of the coloring pallet among the colors applied to the document. When it is judged that the additional applied color is not designated (No), the CPU 50 shifts to step S202.

In step S202, the CPU 50 judges whether any color (hereinafter, unapplied color) is designated out of the respective colors of the coloring pallet. When it is judged that the unapplied color is not designated (No), the CPU 50 shifts to step S204, corrects, on the basis of the selected coloring rule, matching colors that match the coloring rule among the colors applied to the document, and shifts to step S206.

In step S206, the CPU 50 judges whether the processing in steps S200 to S204 and S208 to S214 ends for all the selected coloring rules. When it is judged that the processing ends for all the coloring rules (Yes), the CPU 50 ends the series of processing and returns the program to the original processing.

On the other hand, when it is judged in step S206 that the processing in steps S200 to S204 and S208 to S214 does not end for all the selected coloring rules (No), the CPU 50 shifts to step S200.

On the other hand, when it is judged in step S202 that the unapplied color is designated (Yes), the CPU 50 shifts to step S208. The CPU 50 corrects, on the basis of the selected coloring rule, matching colors that match the coloring rule among the colors applied to the document excluding the designated unapplied color and shifts to step S206.

On the other hand, when it is judged in step S200 that the additional applied color is designated (Yes), the CPU 50 shifts to step S210 and judges whether the unapplied color is designated. When it is judged that the unapplied color is not designated (No), the CPU 50 shifts to step S212. The CPU 50 corrects, on the basis of the selected coloring rule, matching colors that match the coloring rule and the designated additional applied colors among the colors applied to the document and shifts to step S206.

On the other hand, when it is judged in step S210 that the unapplied color is designated (Yes), the CPU 50 shifts to step S214. The CPU 50 corrects, on the basis of the selected coloring rule, matching colors that match the coloring rule and the designated additional applied color among the colors applied to the document excluding the unapplied color and shifts to step S206.

Operations in this embodiment will be explained with reference to FIGS. 6 to 12.

First, in the coloring support apparatus 100, the user designate, via the input device 60, document data of a color document to which coloring is applied.

In the coloring support apparatus 100, when the document data is designated, through steps S100 and S102, the document data designated is inputted from the storage or the outside of the coloring support apparatus 100 and color information concerning colors applied to the document is acquired on the basis of the document data inputted.

Figures 6, 7:
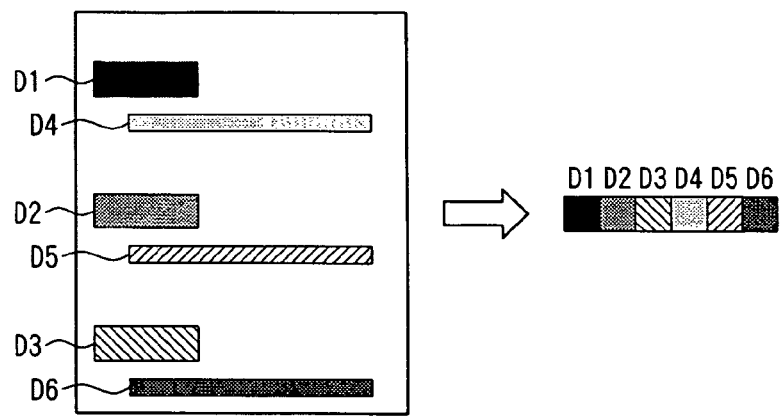
FIG. 6 is a diagram for explaining a case in which color information is extracted from document data.
FIG. 7 is a table for judging whether a coloring rule 4 is applied to a document.

FIG. 6 is a diagram for explaining a case in which color information is extracted from document data.

As shown in FIG. 6, when it is assumed that six colors D1 to D6 are applied to an inputted document, pieces of color information concerning D1 to D6 are extracted, respectively. It is possible to represent the color information with three primary colors of R, G, and B. For example, it is assumed as follows: D1=(69, 151, 197), D2=(38, 154, 197), D3=(122, 179, 190), D4=(226, 228, 199), D5=(212, 231, 210), and D6=(216, 226, 241). As to an area in which a large number of colors are used such as a photograph or a photograph area, color information concerning a representative color is extracted. As to a gradation or a gradation area, color information concerning a color (a color at an edge) used for forming the gradation is extracted.

Subsequently, coloring rules that match coloring applied to the document among the coloring rules in the coloring rule registration DB 10 and matching colors that match the coloring rule among the colors applied to the document are judged repeatedly through step S106. It is assumed that, as shown in FIG. 3, five coloring rules 1 to 5 are registered in the coloring rule registration DB 10.

First, it is judged whether the coloring rule 5 with a highest priority among the sorted coloring rules is applied to the document. Since the coloring rule 5 is a rule of one color, concerning the respective colors D1 to D6 applied to the document, applicability of the coloring rule 5 is judged by judging whether color information of the colors D1 to D6 satisfies Expression (5). When the color information satisfies Expression (5), it is judged that the coloring rule 5 is applied to the document. As a result, since D1, D2, and D3 satisfy Expression (5), a color group satisfying the coloring rule 5 is (D1, D2, D3).

FIG. 7 is a table for judging whether the coloring rule 4 is applied to the document.

Subsequently, it is judged whether the coloring rule 4 with the next highest priority among the sorted coloring rules is applied to the document. Since the coloring rule 4 is a rule between two colors, as shown in FIG. 7, a matrix of combinations of two colors is created and applicability of the coloring rule 4 is judged by judging whether the respective combinations satisfy Expression (4). In the table in FIG. 7, "1" is set when Expression (4) is satisfied and "0" is set when Expression (4) is not satisfied.

A connection relation is formed from FIG. 7 and a color group satisfying the coloring rule 4 is judged. First, since D1 and D2 satisfy Expression (4), with this relation as a reference, a color satisfying Expression (4) with respect to D1 or D2 is judged. Then, it is seen that D6 satisfies Expression (4) with respect to D1 and D3 satisfies Expression (4) with respect to D2. Similarly, looking at D6 or D3, it is seen that no color satisfies Expression (4) with respect to D6 but D6 satisfies Expression (4) with respect to D3. When these colors are combined, a color group (D1, D2, D3, D6) is obtained.

Since D4 and D5 satisfy Expression (4), with this relation as a reference, a color satisfying Expression (4) with respect to D4 or D5 is judged. Then, it is seen that a color satisfying Expression (4) with respect to D4 or D5 is not present. When these colors are combined, a color group (D4, D5) is obtained.

Therefore, colors satisfying the coloring rule 4 are (D1, D2, D3, D6) and (D4, D5).

Subsequently, it is judged whether the coloring rule 3 with the next highest priority among the sorted coloring rules is applied to the document. Since the coloring rule 3 is a rule between two colors like the coloring rule 4, the judgment is performed according to a method same as the method for the coloring rule 4. As a result, colors satisfying the coloring rule 3 are (D1, D2) and (D4, D5, D6).

FIG. 8 is a table for judging whether the coloring rule 1 is applied to the document.

Subsequently, it is judged whether the coloring rule 1 with the next highest priority among the sorted coloring rules is applied to the document. Since the coloring rule 1 is a rule for coloring of three colors, as shown in FIG. 8, concerning the respective colors D1 to D6 applied to the document, applicability of the coloring rule 1 is judged by judging whether color information of the colors satisfies Expression (1). In the table in FIG. 8, "1" is set when Expression (1) is satisfied and "0" is set when Expression (1) is not satisfied. A threshold value p1 is set to "16". As a result, a color group satisfying the coloring rule 1 is (D4, D5, D6).

Subsequently, it is judged whether the coloring rule 2 with the lowest priority among the sorted coloring rules is applied to the document. Since the coloring rule 2 is a rule for coloring of two colors, the judgment is performed according to a method same as the method for the coloring rule 1. As a result, a color group satisfying the coloring rule 2 is not present.

Consequently, colors satisfying the respective coloring rules 1 to 5 are as described below.

Coloring rule 5: (D1, D2, D3)
Coloring rule 4: (D1, D2, D3, D6) and (D4, D5)
Coloring rule 3: (D1, D2) and (D4, D5, D6)
Coloring rule 1: (D4, D5, D6)
Coloring rule 2: None Subsequently, through step S112, for each of the judged coloring rules, a name of the coloring rule and a coloring pallet including a matching color group are displayed in association with each other.

Figure 9:
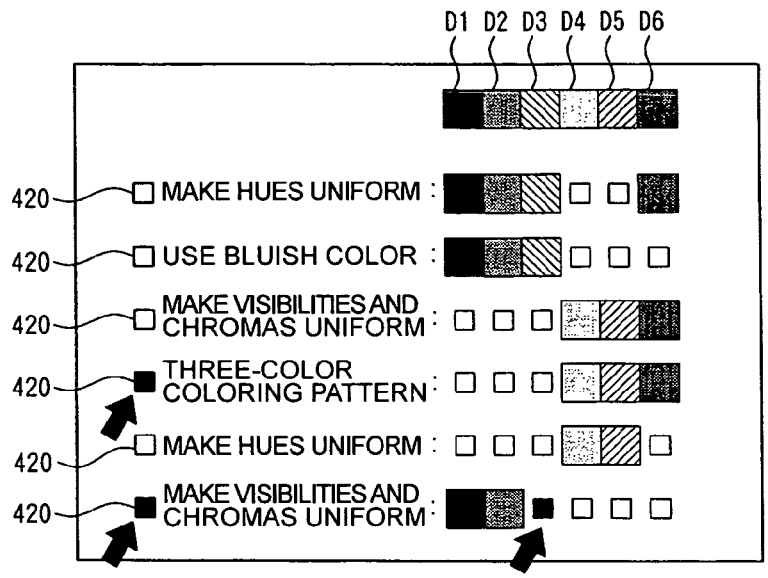
FIG. 9 is a display screen in which coloring rules that match coloring applied to a document are displayed.

FIG. 9 is a display screen in which coloring rules that match coloring applied to a document are displayed.

In the display screen in FIG. 9, the coloring rules are displayed in order from one with a largest number of colors in a matching color group.

A coloring rule with four colors in a matching color group is displayed in a first row.

In the first row, a name of the coloring rule 4 "make hues uniform", a coloring pallet including (D1, D2, D3, D6) among colors satisfying the coloring rule 4, and a check box 420 is displayed. When the user checks the check box 420, it is possible to select this coloring rule. In the coloring pallet, colors other than a matching color group are indicated by white squares. When the user places a mouse cursor on the part of a white square and, for example, clicks the mouse, it is possible to designate a color indicated by the white square as an additional applied color. When the user places the mouse cursor on any color in the coloring pallet and, for example, clicks the mouse, it is possible to designate the color as an unapplied color. For example, when the user double-clicks the mouse, it is possible to request that a color after correction should be displayed for the color.

Coloring rules with three colors in a matching color group are displayed in second to fourth rows.

In the second row, a name "using a bluish color" of the coloring rule 5, a coloring pallet including a color group (D1, D2, D3) satisfying the coloring rule 5, and the check box 420 are displayed.

In the third row, a name "make value and chromas uniform" of the coloring rule 3, a coloring pallet including (D4, D5, D6) among colors satisfying the coloring rule 3, and the check box 420 are displayed.

In the fourth row, a name "three-color coloring pattern" of the coloring rule 1, a coloring pallet including a color group (D4, D5, D6) satisfying the coloring rule 1, and the check box 420 are displayed.

Coloring rules with two colors in a matching color group are displayed in fifth and sixth rows.

In the fifth row, a name "make hues uniform" of the coloring rule 4, a coloring pallet including (D4, D5) among colors satisfying the coloring rule 4, and the check box 420 are displayed.

In the sixth row, a name "make value and chromas uniform" of the coloring rule 3, a coloring pallet including (D1, D2) among colors satisfying the coloring rule 3, and the check box 420 are displayed.

As shown in FIG. 9, the user checks the check boxes 420 in the fourth and the sixth rows and designates D3 as an additional applied color in the coloring pallet in the sixth row. In other words, the user selects the coloring rules 1 and 3 and designates D3 as an additional applied color for the selected coloring rule 3.

In the coloring support apparatus 100, when a coloring rule is selected, through step S118, the coloring correction processing for correcting matching colors that match the coloring rule selected among the colors applied to the document is executed.

Figure 10A:
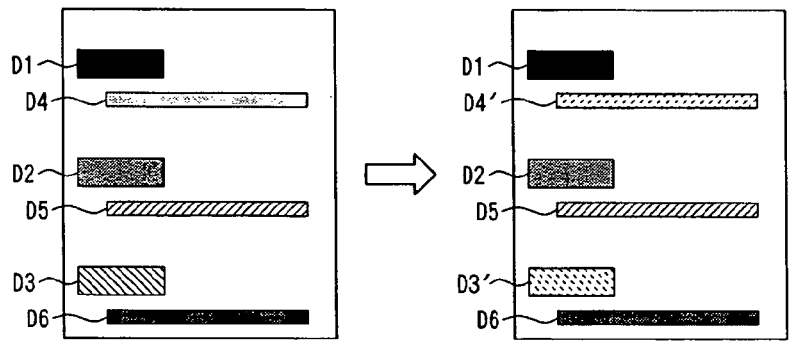
FIG. 10 is a diagram for explaining a case in which colors applied to a document are corrected.
Figure 10B:
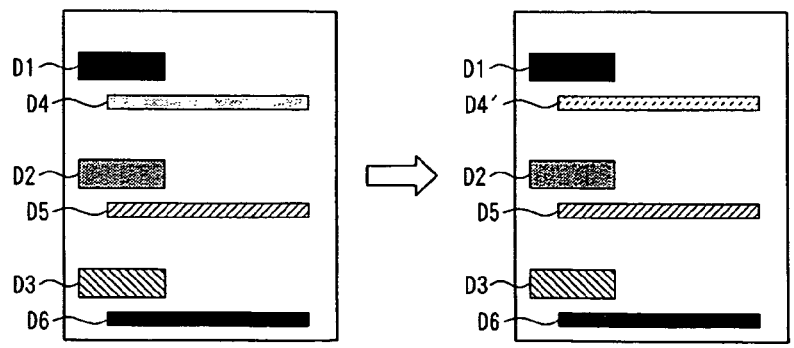

FIG. 10 is a diagram for explaining a case in which colors applied to a document are corrected.

In the coloring correction processing, selected coloring rules are applied in order. As the order for applying the coloring rules, coloring rules with a large number of colors in a matching color group are given priority. Since both the coloring rules 1 and 3 selected have three colors in the matching color group, the coloring rules 1 and 3 are applied in an order of sorting in the coloring rule registration DB 10.

First, the coloring rule 1 is applied. Since a color group satisfying the selected coloring rule 1 is (D4, D5, D6), through step S204, colors D4 to D6 applied to the document are corrected on the basis of the coloring rule 1. In this case, D4 to D6 are corrected to reference colors of three-color coloring patterns, respectively, as shown in FIG. 10(*a*) and below.

$$D4(226,228,199) \rightarrow D4'(236,228,190)$$

$$D5(212,231,210) \rightarrow D5(212,231,210)$$

$$D6(216,226,241) \rightarrow D6(216,226,241)$$

Subsequently, the coloring rule 3 is applied. Since a color group satisfying the selected coloring rule 3 is (D1, D2) and an additional applied color is D3, through step S212, colors D1 to D3 applied to the document are corrected on the basis of the coloring rule 3. In this case, since value and chromas of D1 and D2 are made uniform, visibility and chroma of D3 are corrected to be smaller than a threshold value p2 according to the value and the chromas of D1 and D2 as shown in FIG. 10(*a*) and below.

$$D1(69,151,197) \rightarrow D1(69,151,197)$$

$$D2(38,154,197) \rightarrow D2(38,154,197)$$

$$D3(122,179,190) \rightarrow D3'(56,156,172)$$

In the example described above, the case in which D3 is designated as an additional applied color is explained. When an additional applied color is not designated, as shown in FIG. 10(*b*), D3 is maintained without being corrected.

In the example, values are changed to be within allowable ranges of visibility and chroma on the basis of the coloring rule 3. However, D3 may be corrected as follows in order to improve conformity with D1 and D2.

$$D3(122,179,190) \rightarrow D3'(0,160,182)$$

When coloring rules of plural colors are additionally applied, a color closest to a color presently applied is selected out of the defined plural colors to correct the presently applied color to the defined color.

In the example, a color not belonging to a matching color group of the selected coloring rule and not designated by the user is maintained as it is without being corrected. However, for example, such a color may be corrected according to correction of a closest color, corrected according to correction of closest two colors, or corrected by adjusting a correction amount according to distances to those colors.

In the coloring support apparatus 100, when the coloring correction processing is completed, through step S120, the document data forming the document subjected to coloring correction is outputted to the storage 62.

Figure 11A:
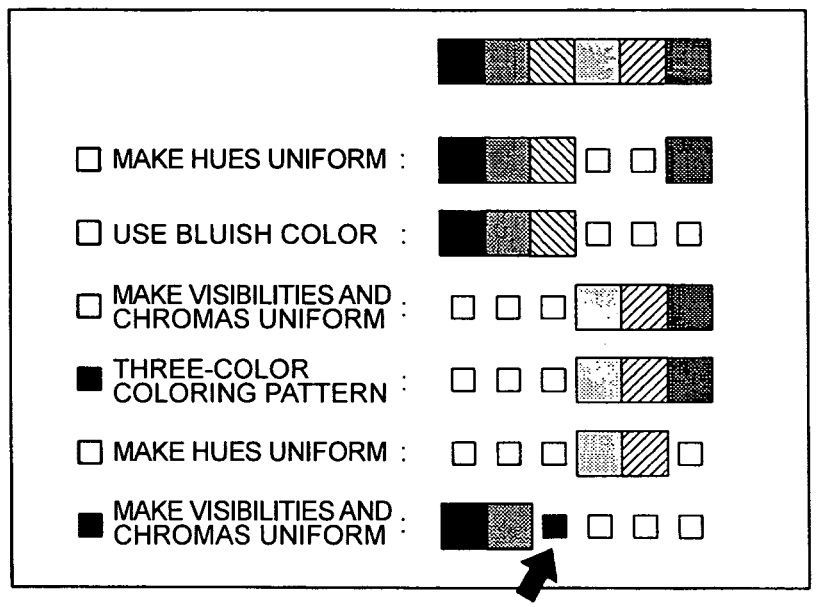
FIG. 11 is a diagram for explaining a case in which a color after correction is displayed.
Figure 11B:
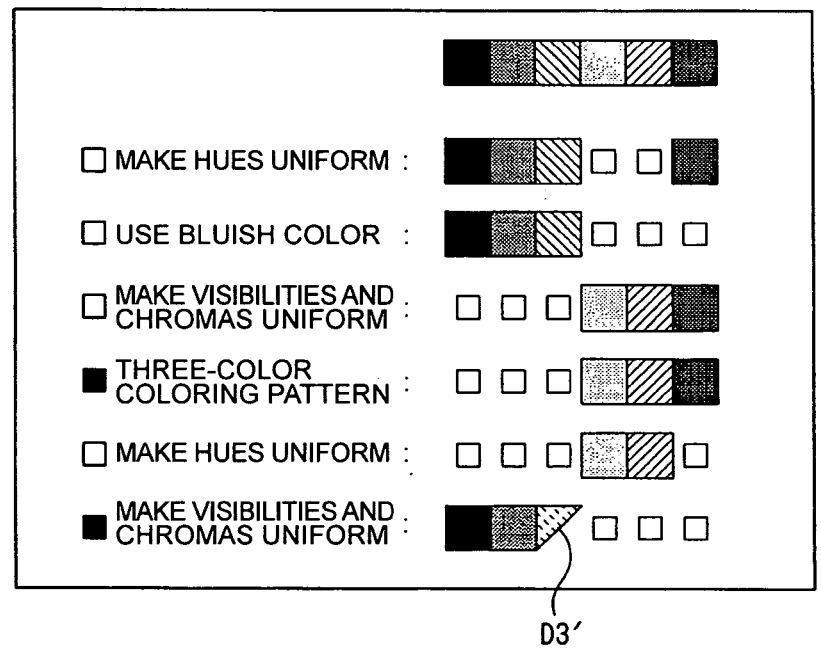

FIG. 11 is a diagram for explaining a case in which a color after correction is displayed.

When the user wishes to grasp a color after correction, the user places the mouse cursor on any color in the coloring pallet and, for example, double-clicks the mouse to request that a color after correction should be displayed for the color. For example, in a display screen in FIG. 11(*a*), it is assumed that the user places the mouse cursor on D3 in the coloring pallet in the sixth row and, for example, double-clicks the mouse.

In the coloring support apparatus 100, when it is requested that a color after correction should be displayed, through step S124, a color after applying a coloring rule corresponding to the coloring pallet to the document is obtained for the color designated. The color after correction obtained is displayed in association with the designated color. In the display screen in FIG. 11(*b*), the color after correction is displayed in a triangular display area corresponding to the position of D3 in the coloring pallet in the sixth row.

Figure 12A:
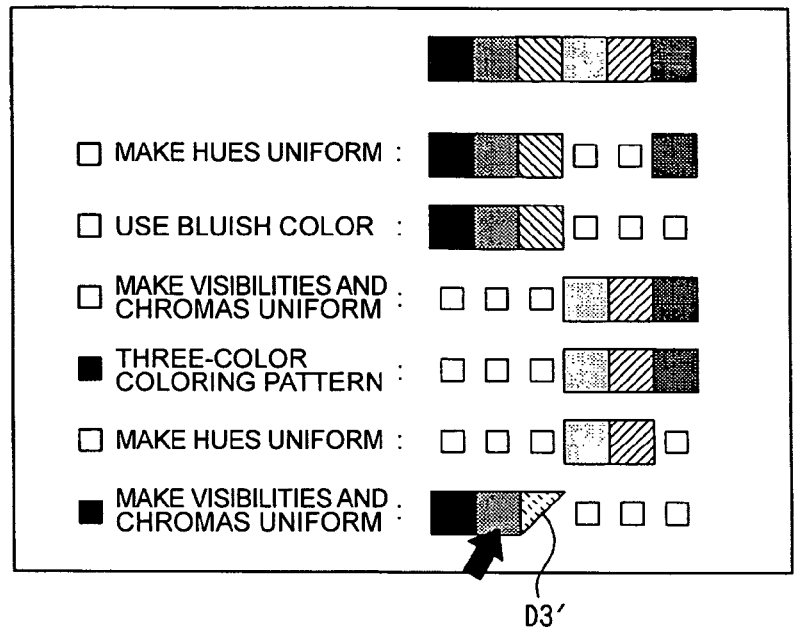
FIG. 12 is a diagram for explaining a case in which an unapplied color is designated.
Figure 12B:
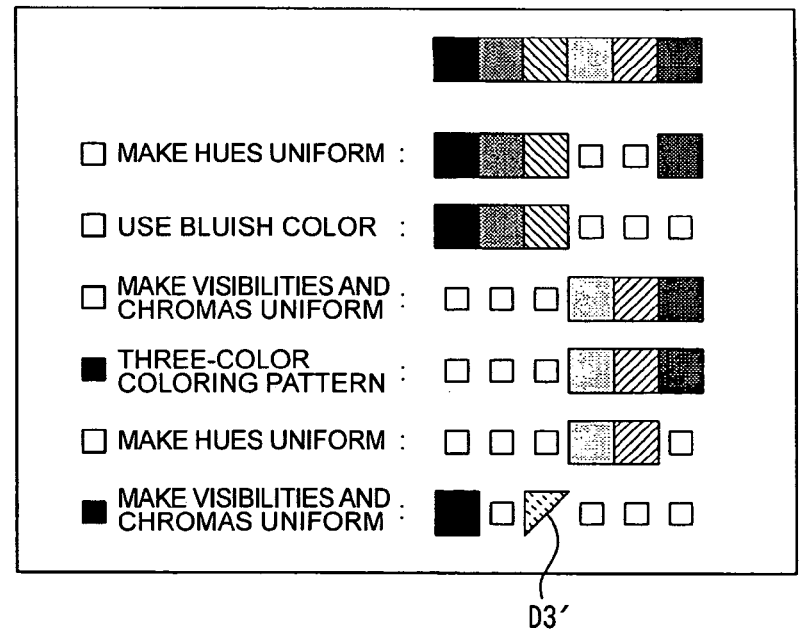

FIG. 12 is a diagram for explaining a case in which an unapplied color is designated.

When the user designates a color that the user does not wish to apply a coloring rule in a displayed matching color group, the user places the mouse cursor on any color in a coloring pallet and, for example, clicks the mouse to designate the color as an unapplied color. For example, in a display screen in FIG. 12(*a*), it is assumed that the user places the mouse cursor on D2 of the coloring pallet in the sixth row and, for example, double-clicks the mouse. In the coloring pallet in the sixth row, D3 is designated as an additional applied color.

In the coloring support apparatus 100, when the unapplied color D2 is designated, as shown in FIG. 12(*b*), a position corresponding to D2 in the coloring pallet in the sixth row is indicated by a white square. Through step S214, the colors D1 and D3 applied to the document are corrected to satisfy Expression (3) on the basis of the selected coloring rule 3.

In this way, in this embodiment, document data forming a document is inputted, color information concerning colors applied to the document is acquired on the basis of the document data inputted, coloring rules that match coloring applied to the document among the coloring rules in the coloring rule registration DB10 and matching colors that match the coloring rules among the colors applied to the document are judged on the basis of the color information acquired. For each of coloring rules judged, a name of the coloring rule and a coloring pallet including the matching color group are displayed in association with each other.

Consequently, coloring rules considered to be applied to the document to which the user applies coloring and matching colors that match the coloring rules among the colors applied to the document are displayed as coloring pallets. Thus, if the user further applies coloring or corrects the present coloring with reference to the coloring rules and the coloring pallets displayed, it is possible to realize coloring relatively matching colors imaged by the user. Therefore, compared with the conventional system, it is easy to realize coloring that matches the colors imaged by the user.

In this embodiment, the user is caused to input selection of any one of the displayed coloring rules and, on the basis of the coloring rule selected, matching colors that match the coloring rule among the colors applied to the document is corrected.

Consequently, on the basis of coloring rules considered to be applied to the document to which the user applies coloring, matching colors that match the coloring rules among the colors applied to the document are corrected. Thus, even a user not having know-how concerning correction of coloring easily realizes coloring that matches colors imaged by the user.

In this embodiment, the user is caused to input designation of an additional applied color and, on the basis of the selected coloring rule, a matching color group and the additional applied color are corrected.

Consequently, when the user designates an additional applied color, a matching color group and the additional applied color are corrected on the basis of the coloring rule. Thus, it is possible to easily expand an applied range of the coloring rule. Therefore, even a user not having know-how concerning correction of coloring more easily realizes coloring that matches colors imaged by the user.

In this embodiment, the user is caused to input designation of an unapplied color and colors other than the unapplied color in the matching color group are corrected on the basis of the selected coloring rule.

Consequently, when the user designates an unapplied color, colors other than the unapplied color in the matching color group is corrected on the basis of the coloring rule. Thus, it is possible to easily reduce an application range of the coloring rule. Consequently, compared with coloring of all the colors according to the coloring rules, it is possible to perform more creative coloring. Therefore, even a user not having know-how concerning correction of coloring more easily realizes coloring that matches colors imaged by the user.

In the first embodiment, the coloring rule registration DB 10 corresponds to the coloring rule storing means in the form 2, 10, 18, or 26. The document data inputting unit 12, the input device 60, and step S100 correspond to the document data inputting means in the form 2. Step S100 corresponds to the document data inputting step in the form 10, 18, or 26. The color information acquiring unit 14 and step S102 correspond to the color information acquiring means in the form 1 or 2. Step S102 corresponds to the color information acquiring step in the form 9, 10, 17, 18, 25, or 26. The coloring rule analyzing unit 16 and steps S104 to S110 and S126 correspond to the coloring rule analyzing means in the form 1 or 2. Steps S104 to S110 and S126 correspond to the coloring rule analyzing step in the form 9, 10, 17, 18, 25, or 26.

In the first embodiment, the coloring rule display unit 18, the display device 64, and step S112 correspond to the coloring rule presenting means in any one of the forms 1 to 3 and 8. Step S112 corresponds to the coloring rule presenting step in any one of the forms 9 to 11, 16 to 19, 24 to 27, and 32. The coloring rule selecting unit 20, the input device 60, and step S114 correspond to the coloring rule selecting means in any one of the forms 3 to 5. Step S114 corresponds to the coloring rule selecting step in any one of the forms 11 to 13, 19 to 21, and 27 to 29.

In the first embodiment, the coloring correcting unit 22 and steps S118, S200 to S214 correspond to the coloring correcting means in any one of the forms 3 to 5. Steps S118, S200 to S214 correspond to the coloring correcting step in any one of the forms 11 to 13, 19 to 21, and 27 to 29. The storage 62 or the RAM 54 corresponds to the storage unit in the form 25 or 26. The CPU 50 corresponds to the arithmetic operation unit in the form 25 or 26.

A second embodiment of the invention will be hereinafter explained with reference to the drawings. FIGS. 13 to 17 are diagrams showing the second embodiment of the coloring support system, the coloring support program, and the storage medium as well as the coloring support method according to the invention.

In this embodiment, the coloring support system, the coloring support program, and the recording medium as well as the coloring support method according to the invention are applied to a case in which, in preparing a color document by applying coloring to a document, guide information for supporting a user's work for applying coloring is displayed and correction of the coloring is automatically performed. The second embodiment is different from the first embodiment in that, other than coloring rules that match the coloring applied to the document, coloring rules related to the coloring rules are displayed. In the following description, only components different from the first embodiment are explained. Components same as those in the first embodiment are denoted by the identical reference numerals and signs and explanations of the components are omitted.

First, schematic functions of the coloring support apparatus 100 to which the invention is applied will be explained with reference to FIG. 13.

Figure 13:
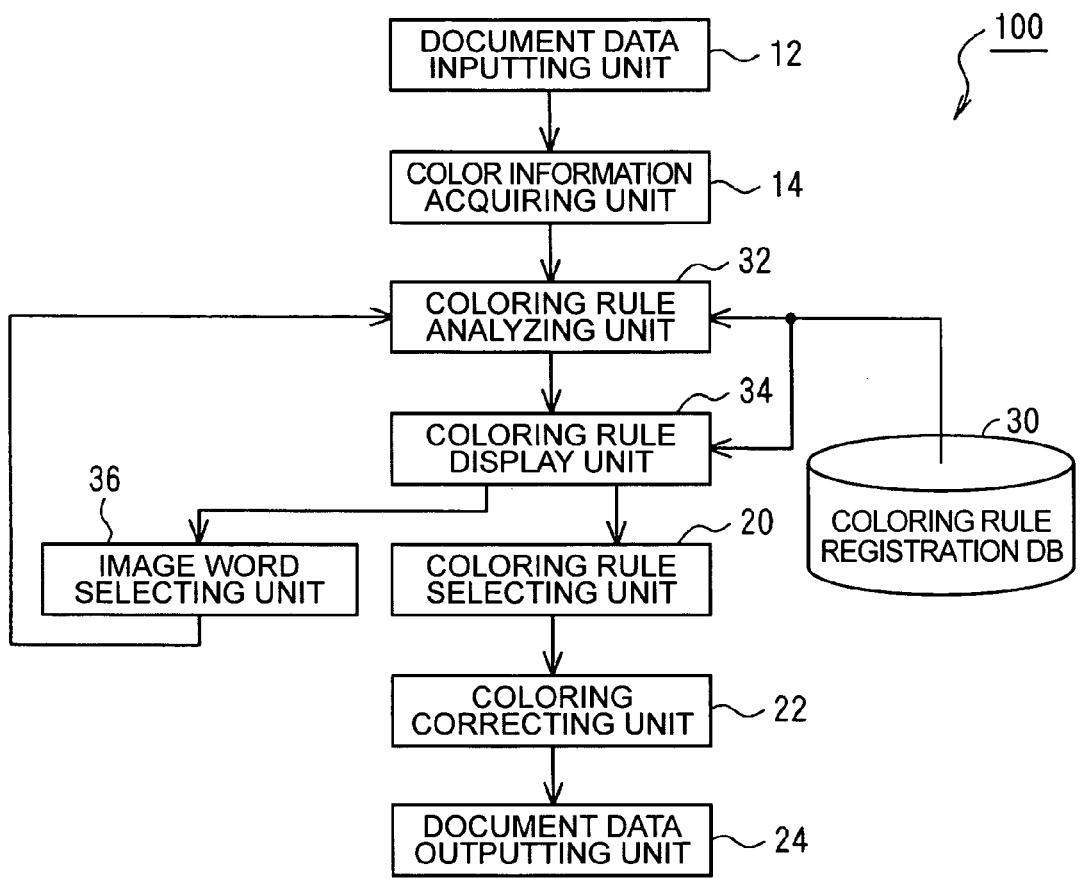
FIG. 13 is a functional block diagram showing schematic functions of the coloring support apparatus 100.

FIG. 13 is a functional block diagram showing the schematic functions of the coloring support apparatus 100.

The coloring support apparatus 100 includes, as shown in FIG. 13, a coloring rule registration DB 30 in which coloring rules and image words are associated with each other, the document data inputting unit 12, and the color information acquiring unit 14.

The coloring support apparatus 100 further includes a coloring rule analyzing unit 32 that analyzes coloring rules applied to a document, a coloring rule display unit 34 that displays the coloring rules obtained by the analysis of the coloring rule analyzing unit 32 in association with image words, and an image word selecting unit 36 that facilitates a user to select any one of the image words displayed by the coloring rule display unit 34 and receives an input.

The coloring rule analyzing unit 32 judges, on the basis of the color information acquired by the color information acquiring unit 14, coloring rules that match the coloring applied to the document among the coloring rules in the coloring rule registration DB 30 and matching colors that match the coloring rules among the colors applied to the document. Further, the coloring rule analyzing unit 32 searches from the coloring rule registration DB 30 other coloring rules corresponding to the image word selected by the image word selecting unit 36.

The coloring rule display unit 34 displays the coloring rules judged by the coloring rule analyzing unit 32, coloring pallets including the matching colors judged by the coloring rule analyzing unit 32, and image words corresponding to the coloring rules in association with one another.

The coloring support apparatus 100 further includes the coloring rule selecting unit 20, the coloring correcting unit 22, and the document data outputting unit 24.

A data structure of the coloring data registration DB 30 will be explained in detail.

FIG. 14 is a diagram showing the data structure of the coloring rule registration DB 30.

In the coloring rule registration DB 30, as shown in FIG. 14, one record is registered for each of coloring rules. Each record includes the field 402 in which a serial number uniquely allocated to the coloring rule is registered, the field 404 in which a name of the coloring rule is registered, the field 406 in which the coloring rule is registered, and a field 408 in which an image word is registered.

In an example in FIG. 14, "intellectual" is registered as the image word in records in fifth, eighth, twelfth, and twenty-third rows. This indicates that coloring rules 1, 8, 12, and 23 are associated with one another by the image word "intellectual".

Concerning the coloring rules, coloring rules 6 to 8, 12, and 23 are added compared with the registered contents in the coloring rule registration DB in the first embodiment. The coloring rules 12 and 23 are rules for multi-color coloring like the coloring rules 1 and 2.

In FIG. 14, the record in the sixth row defines a coloring rule for increasing visibility and chroma. It is possible to define this coloring rule according to the following Expression (7) with an arbitrary one color acquired from document data represented in hue, visibility, and chroma as ($h1$, $v1$, $c1$).

$$c1>13 \& c1+v1>15 \quad (7)$$

In FIG. 14, the record in the seventh row defines a coloring rule for controlling chroma on a wide surface. It is possible to define this coloring rule according to the following Expression (8) with an arbitrary one color acquired from the document data represented in hue, visibility, and chroma as ($h1$, $v1$, $c1$) and a threshold represented as $p3$.

$$Area > p3 \& c1 < 10 \quad (8)$$

In FIG. 14, the record in the eighth row defines a coloring rule for controlling the number of colors. It is possible to define this coloring rule according to the following Expression (9).

$$\text{Number of colors} \leq 3 \quad (9)$$

In the analysis of the coloring rules, the respective coloring rules are checked in order whether the coloring rules are applied to a document. Since the coloring rules are checked in order from the coloring rule having a largest number of colors related to the coloring rule, as in the first embodiment, the coloring rules are sorted in order from one most likely to have a largest number of applied colors or in order from one actually having a largest number of applied colors and registered in the coloring rule registration DB 30.

Processing executed in the CPU 50 will be explained.

Figure 15:
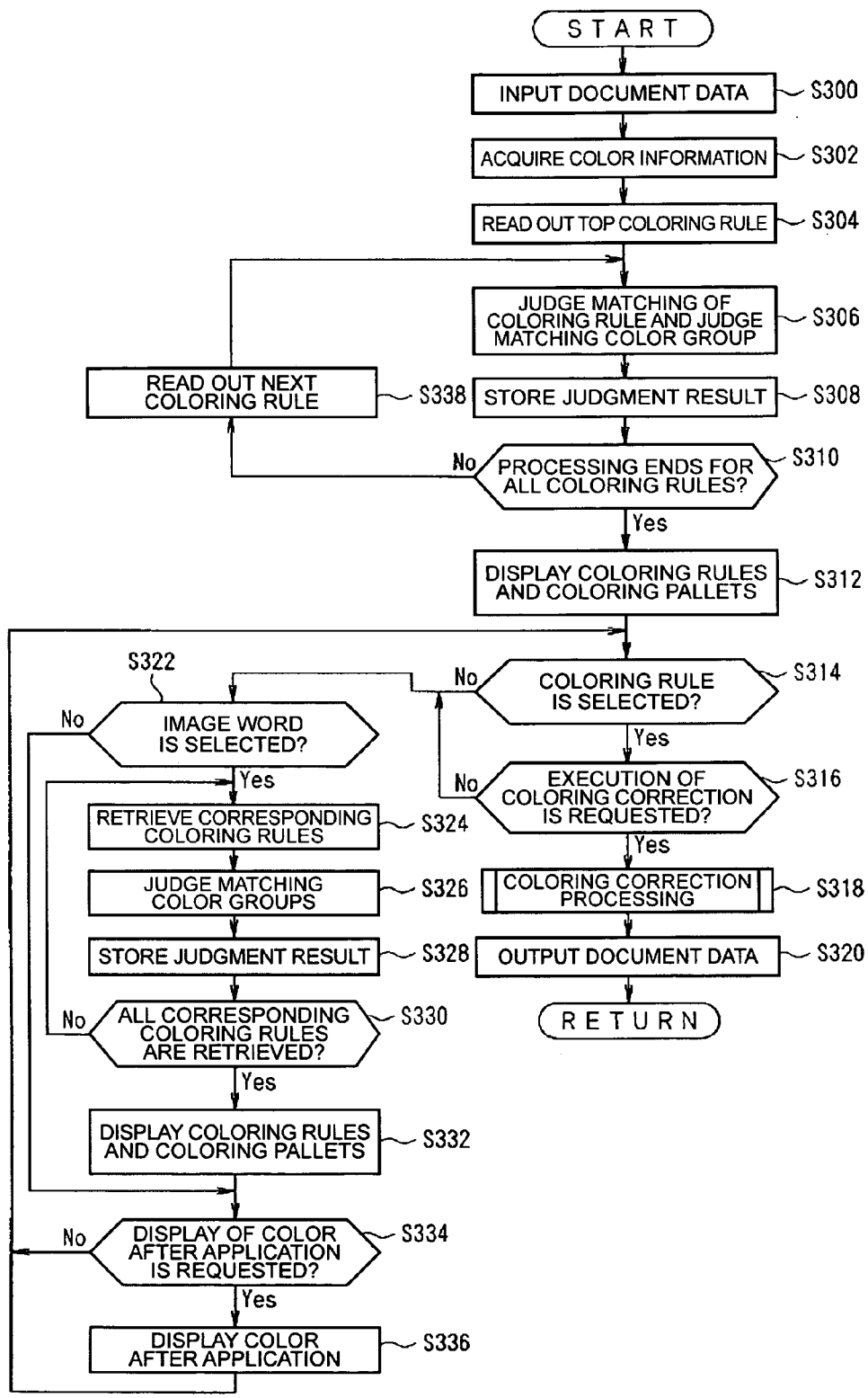
FIG. 15 is a flowchart showing coloring support processing.

The CPU 50 is adapted to execute coloring support processing shown in a flowchart in FIG. 15 instead of the coloring support processing shown in the flowchart in FIG. 4.

FIG. 15 is a flowchart showing the coloring support processing.

The coloring support processing is processing for displaying coloring rules considered to be applied to a document to which a user applies coloring and coloring rules related to the coloring rules and automatically correcting coloring of the document on the basis of coloring rule selected out of the coloring rules by the user. When the coloring support processing is executed in the CPU 50, as shown in FIG. 15, first, the CPU 50 shifts to step S300.

In step S300, the CPU 50 reads out document data to be an object of coloring support from the storage 62 or the outside of the coloring support apparatus 100, stores the document data in the RAM 54, and shifts to step S302. The CPU 50 acquires color information concerning colors applied to the document on the basis of the document data inputted and shifts to step S304.

In step S304, the CPU 50 reads out a top one in the sorted coloring rules from the coloring rule registration DB 30 and shifts to step S306. The CPU 50 judges whether the coloring rule read out matches any one of combinations of the colors applied to the document and judges matching colors that match the read-out coloring rule among the colors applied to the document on the basis of acquired color information. The CPU 50 shifts to step S308.

In step S308, the CPU 50 stores a result of the judgment in step S306 in the storage 62 or the RAM 54 and shifts to step S310. The CPU 50 judges whether the processing in steps S306 and S308 ends for all the coloring rules in the coloring rule registration DB 30. When it is judged that the processing ends for all the coloring rules (Yes), the CPU 50 shifts to step S312.

In step S312, for each of the coloring rules judged in step S306, the CPU 50 displays, on the basis of the judgment result stored in the storage 62 or the RAM 54, a name of the coloring rule, a coloring pallet including a matching color group, and an image word corresponding to the coloring rule on the display device 64 in association with one another and shifts to step S314.

In step S314, the CPU 50 judges whether any coloring rule is selected out of the displayed coloring rules by the input device 60. When it is judged that any coloring rule is selected (Yes), the CPU 50 shifts to step S316 and judges whether it is requested from the input device 60 that coloring correction should be executed. When it is judged that execution of the coloring correction is requested (Yes), the CPU 50 shifts to step S318.

In step S318, the CPU 50 executes coloring correction processing same as that in step S118 and shifts to step S320. The CPU 50 outputs document data forming the document subjected to coloring correction in the coloring correction processing by storing the document data in the storage 62, ends the series of processing, and returns the program to the original processing.

On the other hand, when it is judged in step S316 that it is not requested that correction processing should be executed (No), the CPU 50 shifts to step S322. The CPU 50 judges whether any image word is selected out of the displayed image words by the input device 60. When it is judged that any image word is selected (Yes), the CPU shifts to step S324.

In step S324, the CPU 50 retrieves another coloring rule corresponding to the selected image word from the coloring rule registration DB 30 and shifts to step S326. Since the coloring rule retrieved itself matches none of the combinations of the colors applied to the document, the CPU 50 expands an application range of the retrieved coloring rule by, for example, changing the threshold values (p1, p2, p3) or the constant (3 of the number of colors, etc.) in Expressions (1) to (5) and (7) to (9). The CPU 50 judges matching colors that match the coloring rule with the application range expanded among the colors applied to the document on the basis of acquired color information and shifts to step S328.

In step S328, the CPU 50 stores a result of the judgment in step S326 in the storage 62 or the RAM 54 and shifts to step S330. The CPU 50 judges whether all the other coloring rules corresponding to the selected image word are retrieved. When it is judged that all the other coloring rules are retrieved (Yes), the CPU 50 shifts to step S332.

In step S332, for each of the coloring rules retrieved in step S324, the CPU 50 displays, on the basis of the judgment result stored in the storage 62 or the RAM 54, a name of the coloring rule, a coloring pallet including a matching color group, and an image word corresponding to the coloring rule on the display device 64 in association with one another and shifts to step S334.

In step S334, the CPU 50 judges whether it is requested from the input device 60 that a color after correction should be displayed. When it is judged that it is requested that a color after correction should be displayed (Yes), the CPU 50 shifts to step S336. The CPU obtains, for the designated color, a color after correction of a coloring rule corresponding to the coloring pallet to the document, displays the color after correction obtained on the display device 64 in association with the designated color, and shifts to step S314.

On the other hand, when it is judged in step S334 that it is not requested that the color after correction should be displayed (No), the CPU 50 shifts to step S314.

On the other hand, when it is judged in step S330 that all the other coloring rules corresponding to the selected image word are not retrieved (No), the CPU 50 shifts to step S324.

On the other hand, when it is judged in step S322 that no image word is selected out of the displayed image words (No), the CPU 50 shifts to step S334.

On the other hand, when it is judged in step S314 that no coloring rule is selected out of the displayed coloring rules (No), the CPU 50 shifts to step S322.

On the other hand, when it is judged in step S310 that the processing in steps S306 and S308 does not end for all the coloring rules in the coloring rule registration DB 30 (No), the CPU 50 shifts to step S338, reads out the next coloring rule among the sorted coloring rules from the coloring rule registration DB 30, and shifts to step S306.

Operations in this embodiment will be explained with reference to FIGS. 16 and 17. Since operations up to analysis of a coloring rule are the same as those in the first embodiment, explanations of the operations will be omitted.

In the coloring support apparatus 100, through step S312, for each of the coloring rules judged, a name of the coloring rule, a coloring pallet including a matching color group, and an image word corresponding to the coloring rule are displayed in association with each other.

Figure 16:
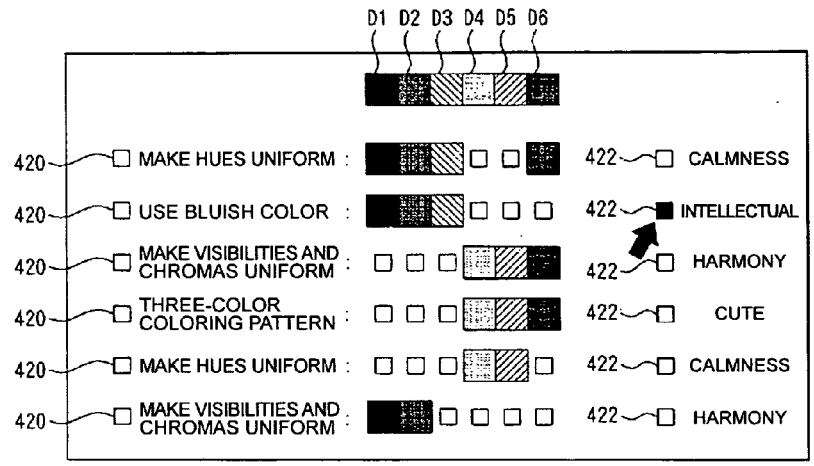
FIG. 16 is a display screen in which coloring rules that match coloring applied to a document are displayed.

FIG. 16 is a display screen in which coloring rules that match coloring applied to a document are displayed.

In the display screen in FIG. 16, in a first row, a name "make hues uniform" of the coloring rule 4, a coloring pallet including (D1, D2, D3, D6) in a color group satisfying the coloring rule 4, an image word "calmness" corresponding to the coloring rule 4, and check boxes 420 and 422 are displayed. When the user checks the check box 420, it is possible to select this coloring rule. When the user checks the check box 422, it is possible to select an image word corresponding to this coloring rule. Colors other than a matching color group are indicated by white squares in the coloring pallet. When the user places the mouse cursor on the part of a white square and, for example, clicks the mouse, it is possible to designate the color as an additional applied color. When the user places the mouse cursor on any color of the coloring pallet and, for example, clicks the mouse, it is possible to designate the color as an unapplied color. When the user double-clicks the mouse, it is possible to request that a color after correction should be displayed for the color.

Similarly, concerning second to sixth rows, a name of a coloring rule, a coloring pallet including a color group satisfying the coloring rule, an image word corresponding to the coloring rule, and the check boxes 420 and 422 are displayed in association with one another.

It is assumed that, as shown in FIG. 16, the user checks the check box 422 in the second row to select the image word "intellectual" corresponding to the coloring rule 5.

In the coloring support apparatus 100, when the image word is selected, other coloring rules corresponding to the image word selected are retrieved from the coloring rule registration DB 30, application ranges of the coloring rules retrieved are expanded by changing a threshold value or a constant, and matching colors that match the coloring rules with the application ranges expanded among the colors applied to the document are judged on the basis of acquired color information repeatedly through steps S324 and S326. As the other coloring rules corresponding to the image word "intellectual", since coloring rules 8, 12, and 23 are present, the coloring rules 8, 12, and 23 are retrieved. It is assumed that, as a result of the expansion of the application ranges, the applied color group changes to (D1, D3, D6) for the coloring rule 8, the application color group changes to (D2, D3) for the coloring rule 12, and the application color group changes to (D4, D5, D6) for the coloring rule 23.

Figure 17:
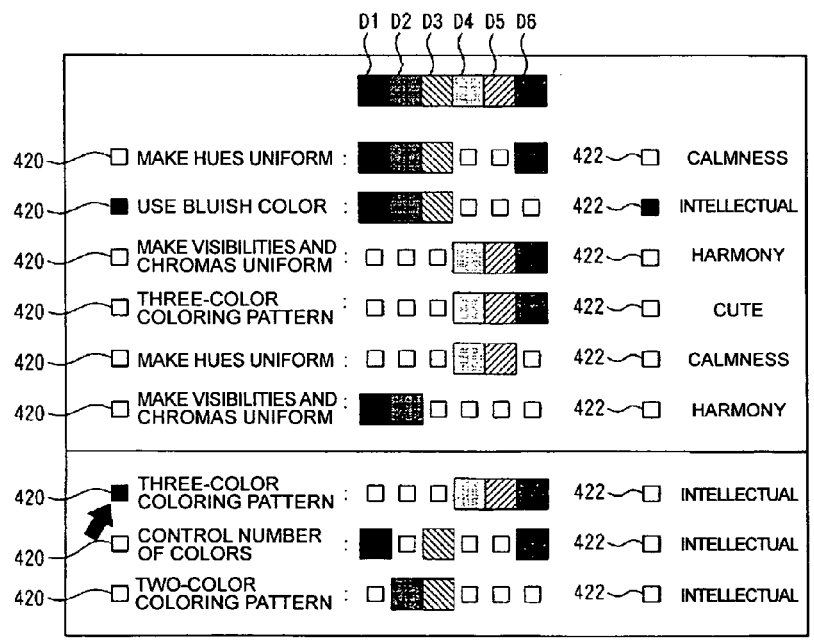
FIG. 17 is a display screen in which coloring rules that match coloring applied to a document and coloring rules related to the coloring rules are displayed.

FIG. 17 is a display screen in which coloring rules that match coloring applied to a document and coloring rules related to the coloring rules are displayed.

In the coloring support apparatus 100, when corresponding coloring rules are retrieved, through step S332, for each of the coloring rules retrieved, a name of the coloring rule, a coloring pallet including a matching color group, and an image word corresponding to the coloring rule are displayed in association with one another.

In the display screen in FIG. 17, the coloring rules that match the coloring applied to the document are displayed in an upper display area and the other coloring rules corresponding to a selected image word are displayed in a lower display area. In the lower display area, in a first row, a name "three-color coloring pattern" of the coloring rule 23, a coloring pallet including a color group (D4, D5, D6) satisfying the coloring rule 23, an image word "intellectual" corresponding to the coloring rule 23, and the check boxes 420 and 422 are displayed.

Similarly, in second and third rows, a name of a coloring rule, a coloring pallet including a color group satisfying the coloring rule, an image word corresponding to the coloring rule, and the check boxes 420 and 422 are displayed in association with one another.

It is assumed that, as shown in FIG. 17, the user checks the check boxes 420 in the second row in the upper display area and the first row in the lower display area to select coloring rules 1 and 23.

In the coloring support apparatus 100, when a coloring rule is selected, through step S318, the coloring correction processing for correcting matching colors that match the coloring rule selected in the colors applied to the document is executed.

In the coloring correction processing, first, the colors applied to the document are corrected on the basis of a coloring rule selected out of the other coloring rules corresponding to the image word (in the lower display area). Then, the colors applied to the document are corrected on the basis of a coloring rule selected out of the coloring rules that match coloring applied to the document (in the upper display area).

In the coloring support apparatus 100, when the coloring correction processing is completed, through step S320, document data forming the document subjected to coloring correction is outputted to the storage 62.

In this way, in this embodiment, document data forming a document is inputted, color information concerning colors applied to the document is acquired on the basis of the document data inputted, and coloring rules that match coloring applied to the document among the coloring rules in the coloring rule registration DB 30 and matching colors that match the coloring rules among the colors applied to the document are judged on the basis of the color information acquired. For each of the coloring rules judged, a name of the coloring rules, a coloring pallet including a matching color group, and image words corresponding to the coloring rule are displayed in association with one another. The user is caused to input selection of any one of the image words displayed and other coloring rules corresponding to the image word searched are retrieved from the coloring rule registration DB 30. For each of the coloring rules retrieved, a name of the coloring rule, a coloring pallet including a matching color group, and image words corresponding to the coloring rule are displayed in association with one another.

Consequently, when the user selects an image word that matches colors imaged by the user, it is possible to refer to other coloring rules corresponding to the image word. Thus, it is possible to perform retrieval complying with the image. This makes it easier to realize coloring that matches the colors imaged by the user.

In the second embodiment, the coloring rule registration DB 30 corresponds to the coloring rule storing means in the form 2, 6, 7, 10, 14, 15, 18, 22, 23, 26, 30, or 31. The document data inputting unit 12, the input device 60, and step S300 correspond to the document data inputting means in the form 2. Step S300 corresponds to the document data inputting step in the form 10, 18, or 26. The color information acquiring unit 14 and step S302 correspond to the color information acquiring means in the form 1 or 2. Step S302 corresponds to the color information acquiring step in the form 9, 10, 17, 18, 25, or 26.

In the second embodiment, the coloring rule analyzing unit 32 and steps S304 to S310, S324 to S330, and S338 correspond to the coloring rule analyzing means in the form 1, 2, 6, or 7. Steps S304 to S310, S324 to S330, and S338 correspond to the coloring rule analyzing step in the form 9, 10, 14, 15, 17, 18, 22, 23, 25, 26, 30, or 31. The coloring rule display unit 34, the display device 64, and steps S312 and S332 correspond to the coloring rule presenting means in any one of the forms 1 to 3, 7, and 8. Steps S312 and S332 correspond to the coloring rule presenting step in any one of the forms 9 to 11, 15 to 19, 23 to 27, and 31.

In the second embodiment, the image word selecting unit 36, the input device 60, and step S322 correspond to the image word selecting means in the form 7. Step S322 corresponds to the image word selecting step in the form 15, 23, or 31. The coloring rule selecting unit 20, the input device 60, and step S314 correspond to the coloring rule selecting means in any one of the forms 3 to 5. Step S314 corresponds to the coloring rule selecting step in any one of the forms 11 to 13, 19 to 21, and 27 to 29. The coloring correcting unit 22 and steps S318 and S200 to S214 correspond to the coloring correcting means in any one of the forms 3 to 5. Steps S318 and S200 to S214 correspond to the coloring correcting step in any one of the forms 11 to 13, 19 to 21, and 27 to 29.

In the second embodiment, the storage 62 or the RAM 54 correspond to the storing unit in the form 25 or 26. The CPU 50 corresponds to the arithmetic operation unit in the form 25 or 26.

In the first and the second embodiments, for each of the coloring rules in the coloring rule registration DBs 10 and 30, after judging applicability of the coloring rule, the coloring rules judged is displayed. However, the invention is not limited to this. It is also possible to perform judgment for applicability and display for each of the coloring rules in the coloring rule registration DBs 10 and 30.

In the first and the second embodiments, coloring rules are displayed in order from one having a largest number of colors of a matching color group. However, the invention is not limited to this. It is also possible to display the coloring rules in an order of sorting of the coloring rules in the coloring rule registration DBs 10 and 30.

In the first and the second embodiments, document data forming a document subjected to coloring correction is outputted by storing the document data in the storage 62. However, the invention is not limited to this. It is also possible to output the document data in a form readable by other apparatuses and application software or output the document data to a printer, a display, or the like.

In the first and the second embodiments, coloring pallets including matching colors are displayed. However, the invention is not limited to this. It is also possible to display coloring pallets including colors approximating to the matching colors, coloring pallets including colors after correction, the color matching groups, or coloring pallets including colors obtained by combining colors selected out of the matching colors, the colors approximating to the matching colors, or the colors after correction.

In the first and the second embodiments, names of coloring rules are displayed. However, the invention is not limited to this. It is also possible to display the coloring rules themselves or other identification information for the coloring rules.

In the second embodiment, coloring rules are registered in the coloring rule registration DB 30 in association with image words. However, the invention is not limited to this. It is also possible to register the coloring rules in the coloring rule registration DB 30 in association with information on an application, a policy, other purposes of a document or information on a category of the document. It is also possible to register related coloring rules in the coloring rule registration DB 30 in direct association with each other. As a constitution for the registration, for example, it is possible to propose a constitution described below.

FIG. 18 is a diagram showing a data structure of the coloring rule registration DB 30.

In the coloring rule registration DB 30, as shown in FIG. 18, one record is registered for each of coloring rules. Each record includes, instead of the field 408 in FIG. 14, a field 410 in which serial numbers of related coloring rules are registered.

In the example in FIG. 18, in a record in a first row, "15 and 19" are registered as the serial numbers of related coloring rules. This indicates that the coloring rules 1, 15, and 19 are related.

When the coloring rule registration DB 30 includes contents shown in FIG. 18, the display screen in FIG. 16 changes as shown in FIG. 19.

FIG. 19 is a display screen in which coloring rules that match coloring applied to a document are displayed.

Figure 20:
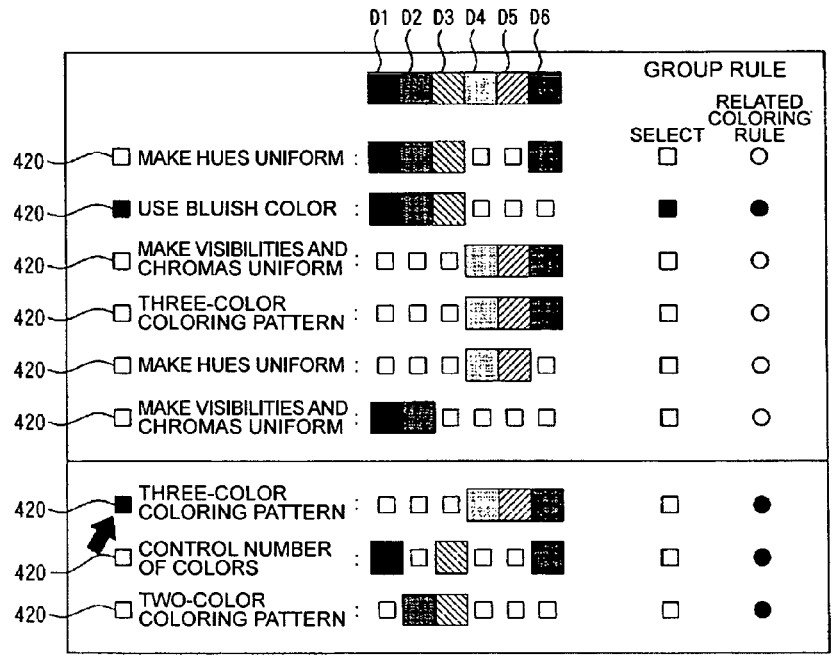
FIG. 20 is a display screen in which coloring rules that match coloring applied to a document and coloring rules related to the coloring rules are displayed.

In the display screen in FIG. 19, a related coloring rule is selected for the coloring rule 5 for "use a bluish color". In the coloring support apparatus 100, when selection of a related coloring rule is received, the related coloring rule of the coloring rule 5 is judged by tracing the coloring rules in the coloring rule registration DB 30. As shown in FIG. 20, the related coloring rule judged is displayed.

FIG. 20 is a display screen in which coloring rules that match coloring applied to the document and coloring rules related to the coloring rules are displayed.

In the display screen in FIG. 20, a result obtained by tracing coloring rules up to a second tier is displayed. As a first tier, the coloring rule 8 "control the number of colors" and the coloring rule 23 "three-color coloring pattern" are retrieved from the coloring rule 5 "use a bluish color". Subsequently, as a second tier, the coloring rule 12 "two-color coloring pattern" is retrieved from the coloring rule 8 and the coloring rules 8 and 12 are retrieved from the coloring rule 23. Since the coloring rules are traced in two tiers, when the rules are listed, the coloring rules 8, 12, and 23 are judged as related coloring rules. Therefore, the coloring rules 8, 12, and 13 are displayed as related coloring rules of the coloring rule 5.

In the second embodiment, application ranges of retrieved coloring rules are expanded, matching colors that match the coloring rules with the application ranges expanded among colors applied to a document are judged on the basis of acquired color information, and, for each of the coloring rules retrieved, a name of the coloring rule, a coloring pallet including a matching color group, and image words corresponding to the coloring rule are displayed in association with one another. However, the invention is not limited to this. It is also possible to display, for each of the retrieved coloring rules, a name of the coloring rule and a coloring pallet including a matching color group in association with each other without performing the processing in step S326.

In the first and the second embodiments, the coloring rule registration DBs 10 and 30 are provided as external devices of the coloring support apparatus 100. However, the invention is not limited to this. It is also possible to provide the coloring rule registration DBs 10 and 30 in arbitrary terminals on a network and connect the coloring support apparatus 100 and the terminals with the network such that the coloring support apparatus 100 uses the DBs 10 and 30 in the terminals. Similarly, it is possible to arrange the document data inputting unit 12, the color information acquiring unit 14, the coloring rule analyzing unit 16 or 32, the coloring rule display unit 18 or 34, the coloring rule selecting unit 20, the coloring correcting unit 22, the document data outputting unit 24, and the image word selecting unit 36 in plural devices in an distributed manner. As a constitution for the arrangement, for example, it is possible to propose the following seven constitutions.

First, a first constitution will be explained.

Figure 21:
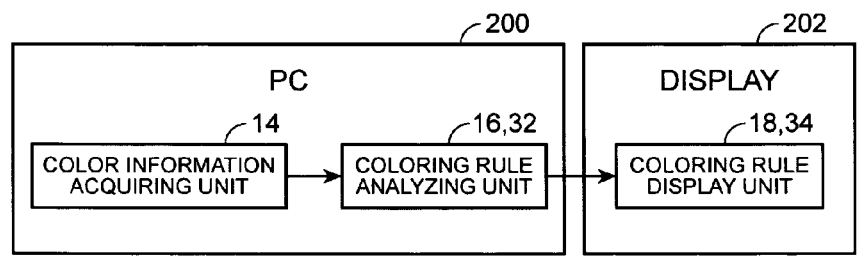
FIG. 21 is a first functional block diagram showing schematic functions in the case in which the invention is applied to a constitution including a PC 200 and a display 202.

FIG. 21 is a first functional block diagram showing schematic functions in the case in which the invention is applied to a constitution including a PC 200 and a display 202.

As shown in FIG. 21, the display 202 is connected to the PC 200.

The PC 200 includes the color information acquiring unit 14 and the coloring rule analyzing unit 16 or 32 and outputs coloring rules obtained in analysis by the coloring rule analyzing unit 16 or 32 to the display 202.

The display 202 includes the coloring rule display unit 18 or 34. When coloring rules are inputted from the PC 200, the display 202 outputs the coloring rules inputted to the coloring rule display unit 18 or 34.

The coloring rule registration DB 10, the document data inputting unit 12, the coloring rule selecting unit 20, the coloring correcting unit 22, the document data outputting unit 24, and the image word selecting unit 36 do not have to be provided. When these units are provided, it is possible to provide the units in the PC 200, the display 202, and other devices according to circumstances. The same holds true for a fourth constitution.

A second constitution will be explained.

Figure 22:
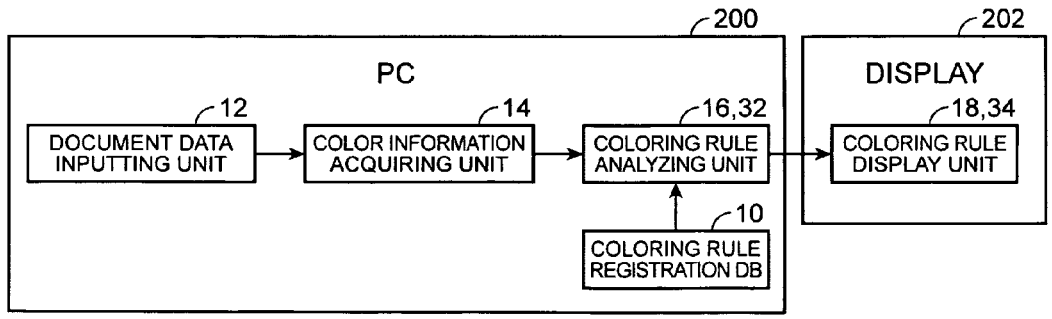
FIG. 22 is a second functional block diagram showing the schematic functions in the case in which the invention is applied to the constitution including the PC 200 and the display 202.

FIG. 22 is a second functional block diagram showing schematic functions in the case in which the invention is applied to the constitution including the PC 200 and the display 202.

As shown in FIG. 22, the display 202 is connected to the PC 200.

The PC 200 includes the coloring rule registration DB 10, the document data input unit 12, the color information acquiring unit 14, and the coloring rule analyzing unit 16 or 32 and outputs coloring rules obtained in analysis by the coloring rule analyzing unit 16 or 32 to the display 202.

The display 202 includes the coloring rule display unit 18 or 34. When coloring rules are inputted from the PC 200, the display 202 outputs the coloring rules inputted to the coloring rule display unit 18 or 34.

The coloring rule selecting unit 20, the coloring correcting unit 22, the document data output unit 24, and the image word selecting unit 36 do not have to be provided. When the units are provided, it is possible to provide the units in the PC 200, the display 202, and other devices according to circumstances. The same holds true for third and fifth to seventh constitutions.

The third constitution will be explained.

Figure 23:
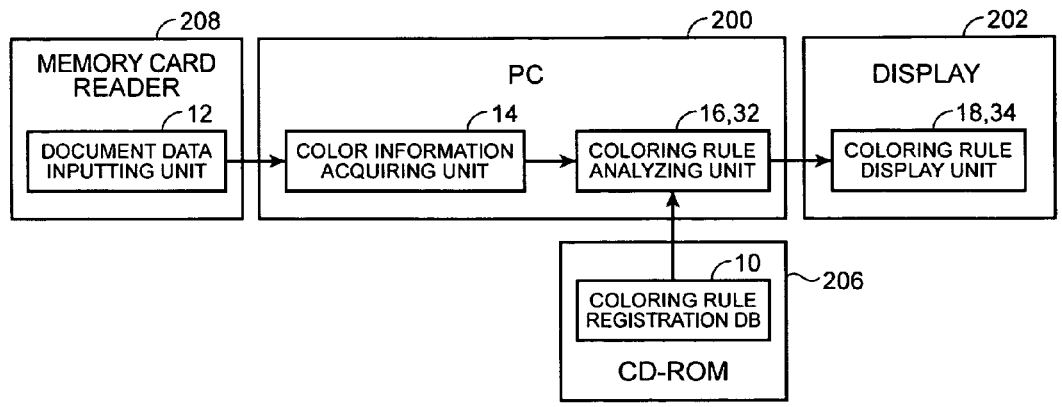
FIG. 23 is a third functional block diagram showing the schematic functions in the case in which the invention is applied to the constitution including the PC 200 and the display 202.

FIG. 23 is a functional block diagram showing schematic functions in the case in which the invention is applied to the constitution including the PC 200 and the display 202.

As shown in FIG. 23, the display 202 is connected to the PC 200.

The PC 200 includes, other than the color information acquiring unit 14 and the coloring rule analyzing unit 16 or 32, the document data inputting unit 12 serving as a memory card reader 208 and a CD-ROM reader that reads coloring rules from the coloring rule registration DB 10 serving as a CD-ROM 206. The PC 200 outputs document data read by the document data inputting unit 12 to the color information acquiring unit 14 and outputs coloring rules obtained in analysis by the coloring rule analyzing unit 16 or 32 to the display 202. The coloring rule analyzing unit 16 or 32 judges, on the basis of color information acquired by the color information acquiring unit 14, coloring rules that match coloring applied to a document among the coloring rules read by the CD-ROM reader.

The display 202 includes the coloring rule display unit 18 or 34. When coloring rules are inputted from the PC 200, the display 202 outputs the coloring rules inputted to the coloring rule display unit 18 or 34.

The fourth constitution will be explained.

Figure 24:
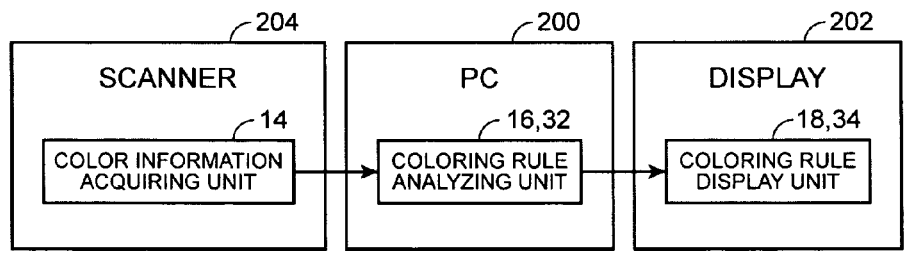
FIG. 24 is a first functional block diagram showing a schematic functions in the case in which the invention is applied to a constitution including the PC 200, the display 202, and a scanner 204.

FIG. 24 is a first functional block diagram showing schematic functions in the case in which the invention is applied to a constitution including the display 202 and a scanner 204.

As shown in FIG. 24, the display 202 and the scanner 204 are connected to the PC 200.

The scanner 204 includes the color information acquiring unit 14 serving as an optical reading unit and outputs color information acquired by the color information acquiring unit 14 to the PC 200.

The PC 200 includes the coloring rule analyzing unit 16 or 32. When the color information is inputted from the scanner 204, the PC 200 outputs the color information inputted to the coloring rule analyzing unit 16 or 32 and outputs coloring rules obtained in analysis by the coloring rule analyzing unit 16 or 32 to the display 202.

The display 202 includes the coloring rule display unit 18 or 34. When the coloring rules are inputted from the PC 200, the display 202 outputs the coloring rules inputted to the coloring rule display unit 18 or 34.

The fifth constitution will be explained.

Figure 25:
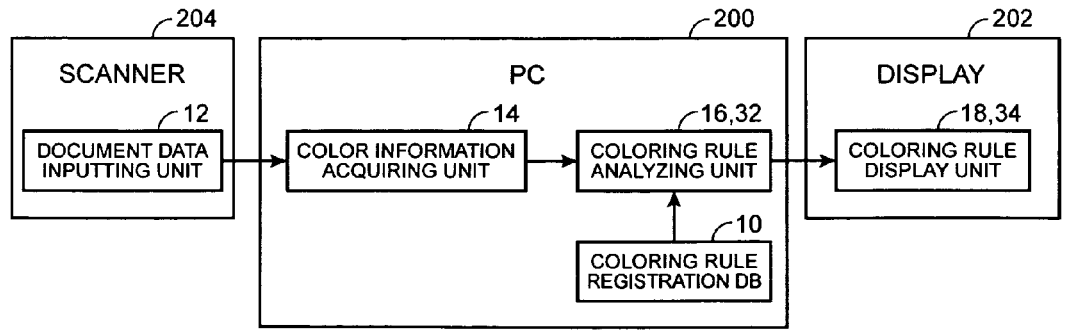
FIG. 25 is a second functional block diagram showing the schematic functions in the case in which the invention is applied to the constitution including the PC 200, the display 202, and the scanner 204.

FIG. 25 is a second functional block diagram showing schematic functions in the case in which the invention is applied to the constitution including the PC 200, the display 202, and the scanner 204.

As shown in FIG. 25, the display 202 and the scanner 204 are connected to the PC 200.

The scanner 204 includes the document data inputting unit 12 serving as an optical reading unit and outputs document data inputted by the document data inputting unit 12 to the PC 200.

PC 200 includes the coloring rule registration DB 10, the color information acquiring unit 14, and the coloring rule analyzing unit 16 or 32. When document data is inputted from the scanner 204, the PC 200 outputs the document data inputted to the color information acquiring unit 14 and outputs coloring rules obtained in analysis by the coloring rule analyzing unit 16 or 32 to the display 202.

The display 202 includes the coloring rule display unit 18 or 34. When the coloring rules are inputted from the PC 200, the display 202 outputs the coloring rules inputted to the coloring rule display unit 18 or 34.

The sixth constitution will be explained.

Figure 26:
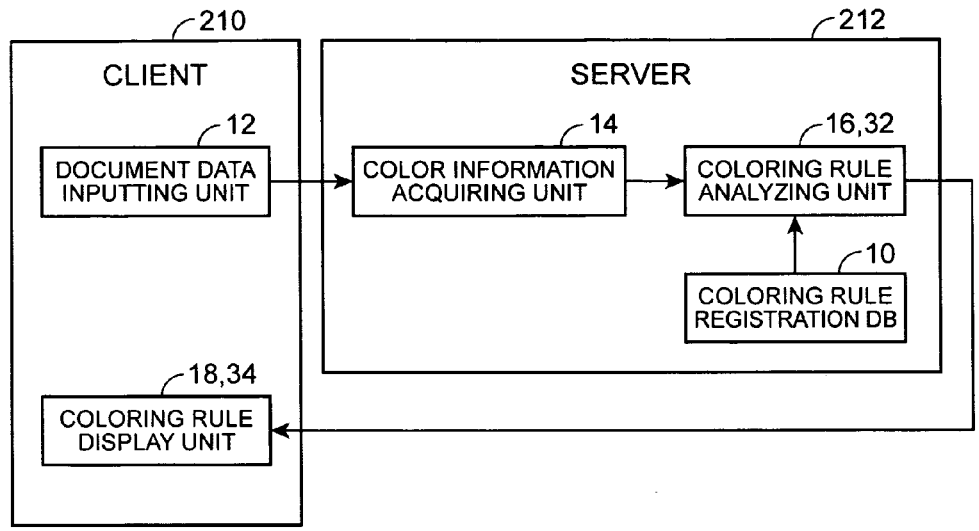
FIG. 26 is a first functional block diagram showing schematic functions in the case in which the invention is applied to a network system including a client 210 and a server 212.

FIG. 26 is a first functional block diagram showing schematic functions in the case in which the invention is applied to a network system including a client 210 and a server 212.

As shown in FIG. 26, the client 210 and the server 212 are connected to a network.

The client 210 includes the document data input unit and the coloring rule display unit 18 or 34. The client 210 transmits document data inputted by the document data inputting unit 12 to the server 212. When coloring rules are received from the server 212, the client 210 outputs the coloring rules received to the coloring rule display unit 18 or 34.

The server 212 includes the coloring rule registration DB 10, the color information acquiring unit 14, and the coloring rule analyzing unit 16 or 32. When the document data is received from the client 210, the server 212 outputs the document data received to the color information acquiring unit 14 and transmits coloring rules obtained in analysis by the coloring rule analyzing unit 16 or 32 to the client 210.

The seventh constitution will be explained.

Figure 27:
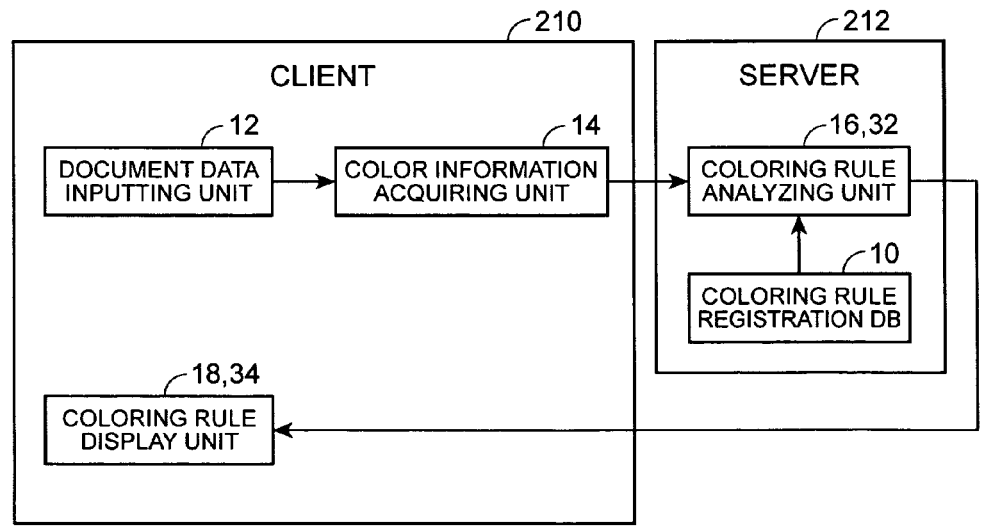
FIG. 27 is a second functional block diagram showing the schematic functions in the case in which the invention is applied to the network system including the client 210 and the server 212.

FIG. 27 is a second functional block diagram showing schematic functions in the case in which the invention is applied to the network system including the client 210 and the server 212.

As shown in FIG. 27, the client 210 and the server 212 are connected to the network.

The client 210 includes the document data input unit 12, the color information acquiring unit 14, and the coloring rule display unit 18 or 34. The client 210 transmits color information acquired by the color information acquiring unit 14 to the server 212. When coloring rules are received from the server 212, the client 210 outputs the coloring rules received to the coloring rule display unit 18 or 34.

The server 212 includes the coloring rule registration DB 10 and the coloring rule analyzing unit 16 or 32. When the color information is received from the client 210, the server 212 outputs the color information received to the coloring rule analyzing unit 16 or 32 and transmits coloring rules obtained in analysis by the coloring rule analyzing unit 16 or 32 to the client 210.

As an eighth constitution, it is also possible to apply the invention to a network system including a facsimile machine and the server 212.

The facsimile machine includes the document data input unit 12 serving as an optical reading unit and transmits document data read by the document data inputting unit 12 to the server 212.

The server 212 includes the color information acquiring unit 14, the coloring rule analyzing unit 16 or 32, and the coloring rule display unit 18 or 34. When the document data is received from the facsimile machine, the server 212 outputs the document data received to the color information acquiring unit 14.

The facsimile machine may have the same function as the client 210 in the sixth or the seventh constitution. In this case, the server 212 has a function corresponding to the function of the facsimile machine.

As a ninth constitution, it is also possible to apply the invention to a machine exclusively used for application software (a kiosk terminal).

As a tenth constitution, it is also possible to apply the invention to an MFP (Multi Function Printer).

Figure 28:
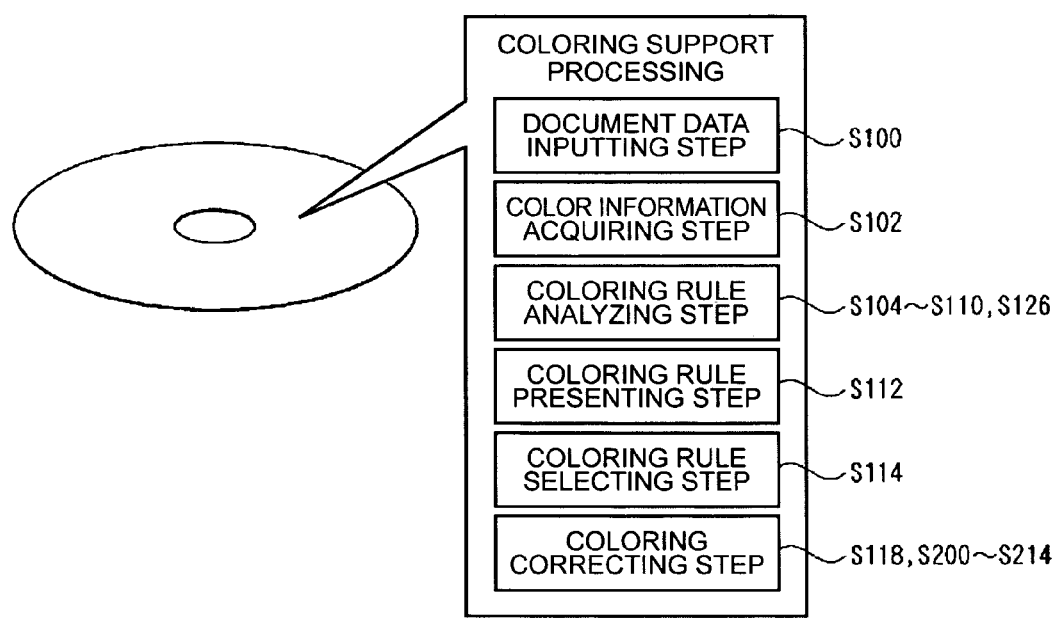
FIG. 28 is a diagram showing a storage medium and a data structure of the storage medium.

In the case explained in the first and the second embodiments, in executing the processing shown in the flowcharts in FIGS. 4, 5, and 15, the control program stored in the ROM 52 in advance is executed. However, the invention is not limited to this. As shown in FIG. 28, a program describing these procedures may be read in the RAM 54 from a storage medium having the program stored therein and executed.

FIG. 28 is a diagram showing the storage medium and a data structure of the storage medium.

The storage medium is a semiconductor storage medium such as a RAM or a ROM, a magnetic storage medium such as an FD or an HD, an optical reading storage medium such as a CD, a CDV, an LD, or a DVD, or a magnetic/optical reading storage medium such as an MO. The storage medium includes any storage medium as long as the storage medium is readable by a computer regardless of a reading method such as an electronic, magnetic, or optical method. The program may be downloaded via a network and executed.

In the first and the second embodiments, the coloring support system, the coloring support program, and the storage medium as well as the coloring support method according to the invention are applied to the case in which, in preparing a color document by applying coloring to a document, guide information for supporting a user's work for applying coloring is provided and correction of the coloring is automatically performed. However, the invention is not limited to this. It is also possible to apply the invention to other cases without departing from the spirit of the invention.

The invention claimed is:

1. A coloring support system that supports work for applying coloring to a document, comprising:
coloring rule storing means that stores coloring rules defining coloring;
document data inputting means that inputs document data forming the document;

color information acquiring means that acquires, on the basis of the document data inputted by the document data inputting means, color information concerning colors applied to the document;

coloring rule analyzing means that judges, on the basis of the color information acquired by the color information acquiring means, coloring rules that match coloring applied to the document among the coloring rules in the coloring rule storing means and matching colors that match the coloring rules among colors applied to the document; and coloring rule presenting means that presents the coloring rules judged by the coloring rule analyzing means and coloring pallets, which include the matching colors judged by the coloring rule analyzing mean, colors approximating to the matching colors, or colors obtained by combining the colors, in association with one another; wherein, the coloring rule storing means groups the coloring rules and stores the coloring rules grouped, and the coloring rule analyzing means judges coloring rules that match the coloring applied to the document among the coloring rules in the coloring rule storing means and other coloring rules belonging to a group identical with a group to which the coloring rule belongs.

2. A coloring support system according to claim 1, further comprising:

coloring rule selecting means that causes a user to input selection of any one of the coloring rules presented by the coloring rule presenting means; and coloring correcting means that corrects, on the basis of the coloring rule selected by the coloring rule selecting means, matching colors that match the coloring rule among the colors applied to the document.

3. A coloring support system according to claim 2, wherein, the coloring rule selecting means can designate an additional applied color out of colors other than those corresponding to the respective colors of the coloring pallets among the colors applied to the document, and the coloring correcting means corrects, on the basis of the coloring rule selected by the coloring rule selecting means, the matching colors and the additional applied color designated by the coloring rule selecting means.

4. A coloring support system according to claim 2 wherein, the coloring rule selecting means can designate an unapplied color out of the respective colors of the coloring pallets, and the coloring correcting means corrects, on the basis of the coloring rule selected by the coloring rule selecting means, colors other than a color corresponding to the unapplied color designated by the coloring rule selecting means in the matching colors.

5. A coloring support system according to claim 1 wherein, the coloring rule storing means stores the coloring rules in association with image words, the coloring rule presenting means presents the coloring rules, the coloring pallets, and the image words corresponding to the coloring rules in association with one another, the coloring support system includes image word selecting means that causes the user to input selection of any one of the image words presented by the coloring rule presenting means, and the coloring rule analyzing means retrieves other coloring rules corresponding to the image word selected by the image word selecting means from the coloring rule storing means.

6. A coloring support system according to claim 1, wherein, the coloring rule presenting means presents the coloring rules and the coloring pallets in association with each other by arranging the coloring rules and the respective colors of the coloring pallets in different directions, respectively.

* * * * *